(12) United States Patent
Cho et al.

(10) Patent No.: US 10,375,308 B2
(45) Date of Patent: Aug. 6, 2019

(54) TERMINAL AND CONTROLLING METHOD THEREOF

(71) Applicant: LG ELECTRONICS INC., Seoul (KR)

(72) Inventors: Taehoon Cho, Seoul (KR); Juha Hyun, Seoul (KR); Arim Kwon, Seoul (KR); Changmok Kim, Seoul (KR); Junghoon Chu, Seoul (KR); Eunhye Kim, Seoul (KR); Yujune Jang, Seoul (KR); Juhye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 15/368,046

(22) Filed: Dec. 2, 2016

(65) Prior Publication Data

US 2018/0063431 A1    Mar. 1, 2018

(30) Foreign Application Priority Data

Aug. 25, 2016    (KR) .................. 10-2016-0108108

(51) Int. Cl.
| | | |
|---|---|---|
| *H04N 5/232* | (2006.01) | |
| *G06F 3/0482* | (2013.01) | |
| *G06F 3/0486* | (2013.01) | |
| *G06F 3/0481* | (2013.01) | |
| *G06F 3/0488* | (2013.01) | |

(52) U.S. Cl.
CPC ......... *H04N 5/23241* (2013.01); *H04N 5/232* (2013.01); *H04N 5/23216* (2013.01); *H04N 5/23222* (2013.01); *H04N 5/23293* (2013.01); *G06F 3/0482* (2013.01); *G06F 3/0486* (2013.01); *G06F 3/04817* (2013.01); *G06F 3/04883* (2013.01)

(58) Field of Classification Search
CPC .................................................. H04N 5/23293
See application file for complete search history.

(56) References Cited

U.S. PATENT DOCUMENTS

| | | |
|---|---|---|
| 8,885,064 B1 | 11/2014 | Cho et al. |
| 2011/0090388 A1* | 4/2011 | Yoon ...................... H04N 5/232 348/333.01 |
| 2012/0009896 A1 | 1/2012 | Bandyopadhyay et al. |
| 2012/0147246 A1 | 6/2012 | Dent et al. |
| 2013/0223812 A1 | 8/2013 | Rossi |
| 2013/0314511 A1 | 11/2013 | Chen et al. |
| 2014/0320723 A1* | 10/2014 | Shirono ............. H04N 5/23293 348/333.05 |
| 2016/0165133 A1 | 6/2016 | Son et al. |
| 2016/0196264 A1 | 7/2016 | Bostick et al. |
| 2017/0078240 A1* | 3/2017 | Sarafa ..................... H04L 51/32 |

FOREIGN PATENT DOCUMENTS

JP    2002-290815 A    10/2002

* cited by examiner

*Primary Examiner* — Christopher K Peterson
(74) *Attorney, Agent, or Firm* — Birch, Stewart, Kolasch & Birch, LLP

(57) ABSTRACT

Disclosed are a terminal and controlling method thereof. The present invention includes enabling an AoC (always on camera) mode for maintaining a state for a camera to capture an image, obtaining a shot input of capturing the image in the enabled AoC mode, and controlling the camera to capture the image instantly.

15 Claims, 32 Drawing Sheets

FIG. 3
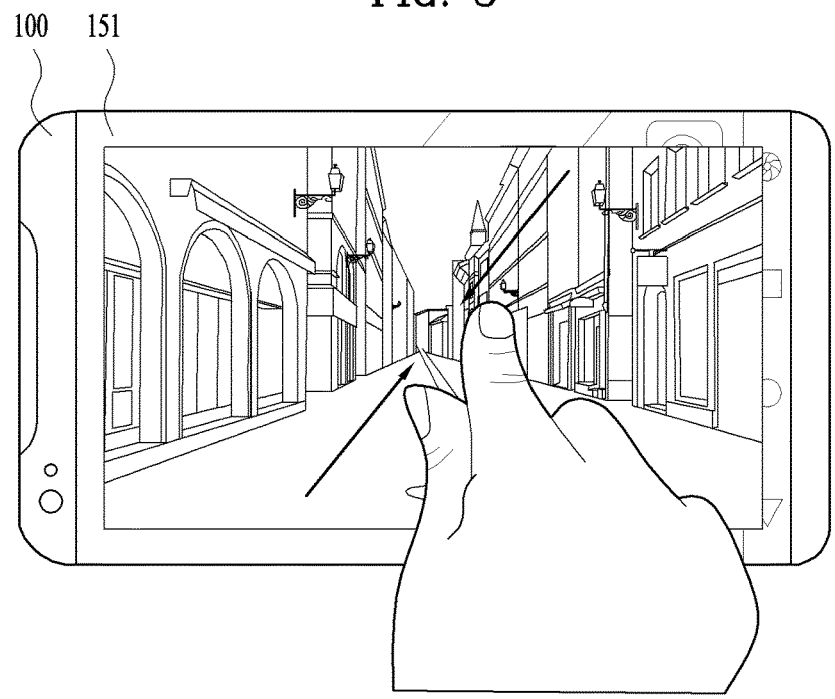
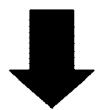
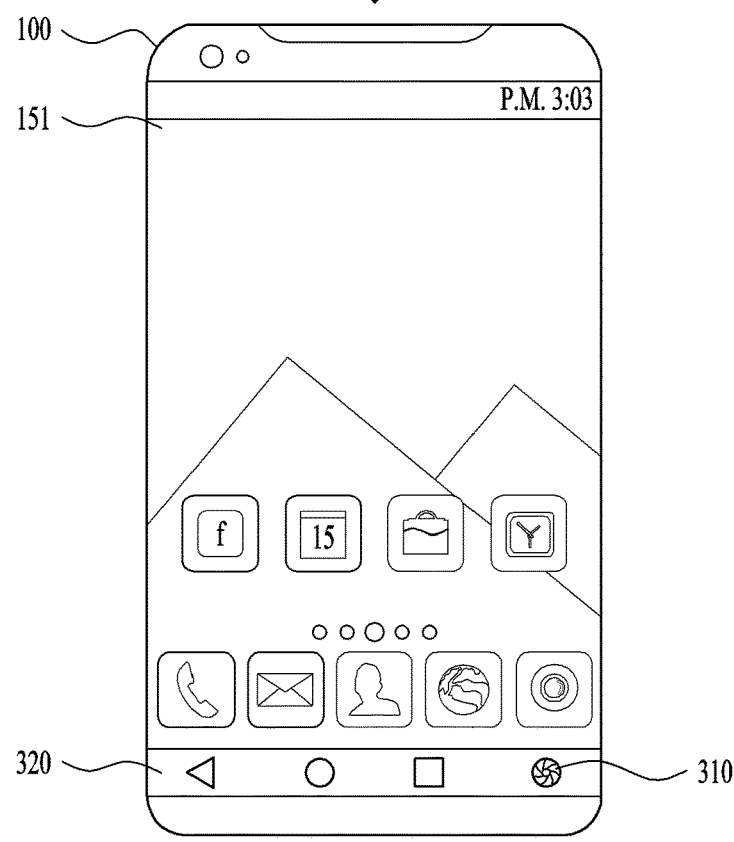

FIG. 8
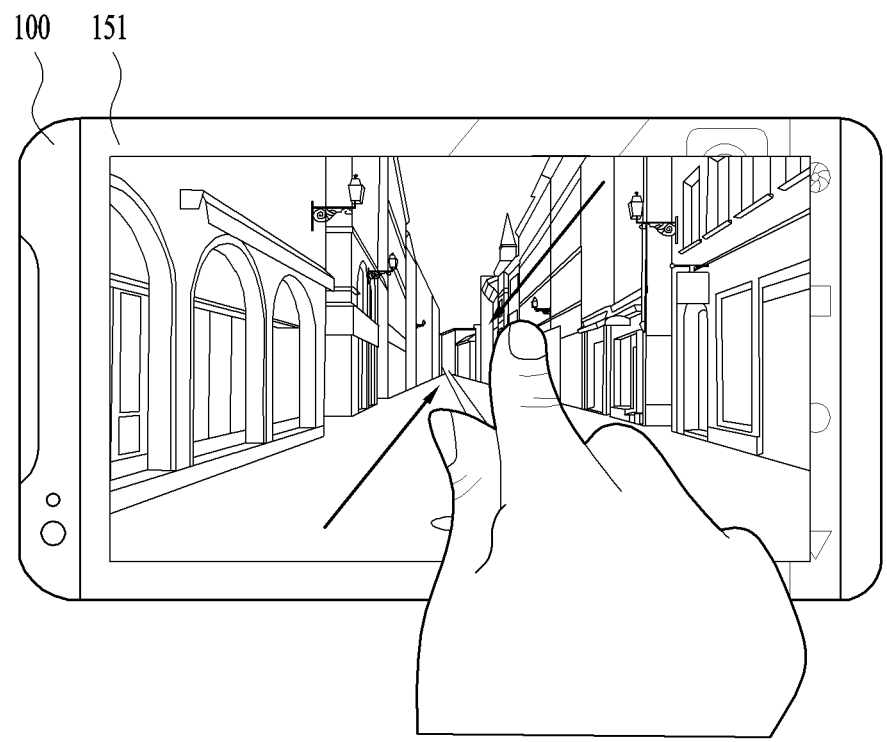
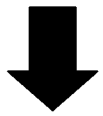
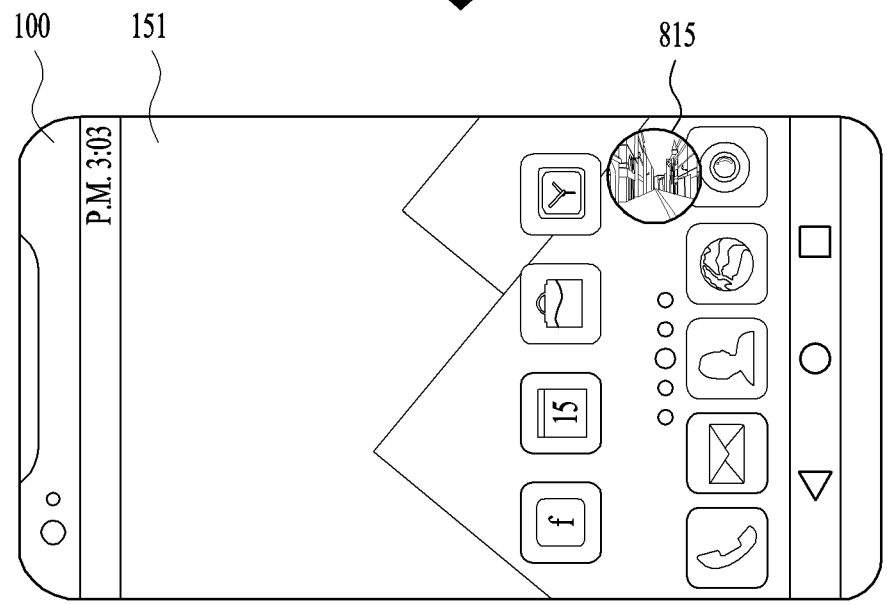

FIG. 9
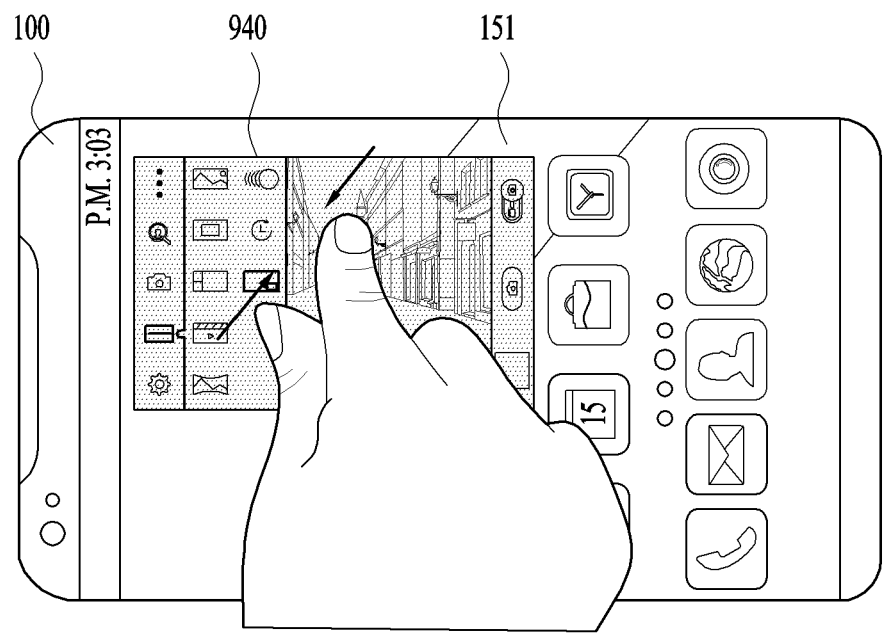
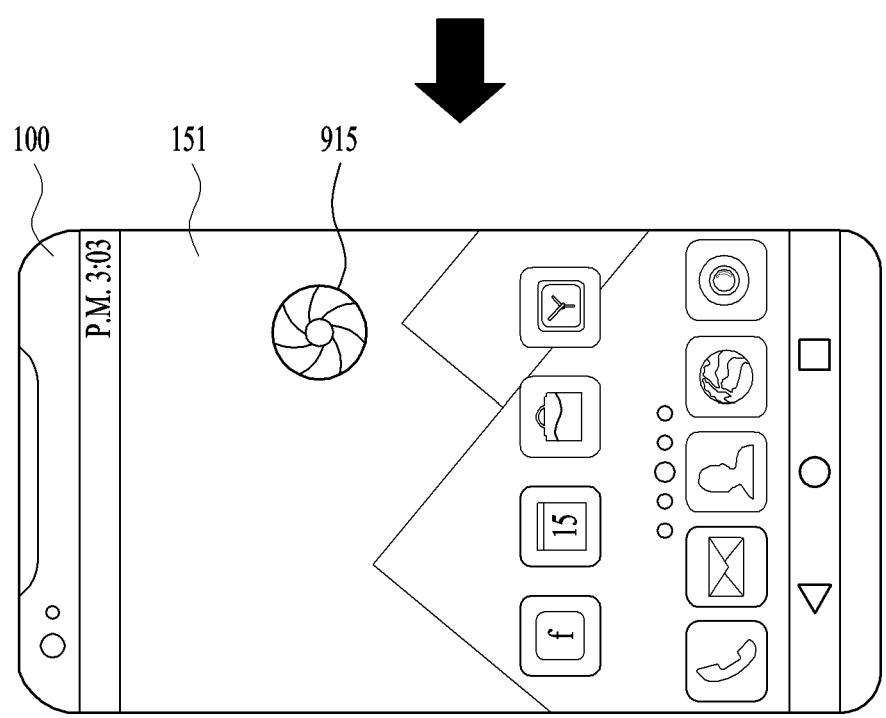

FIG. 30
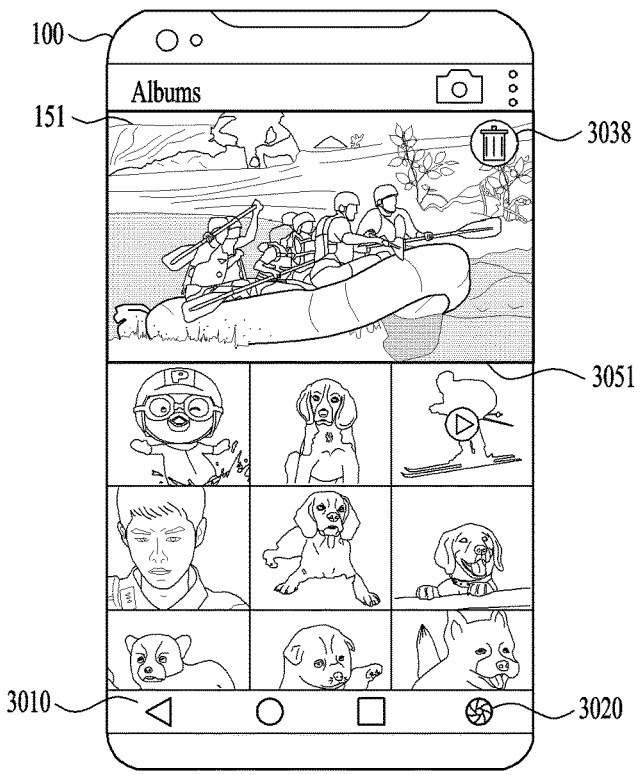
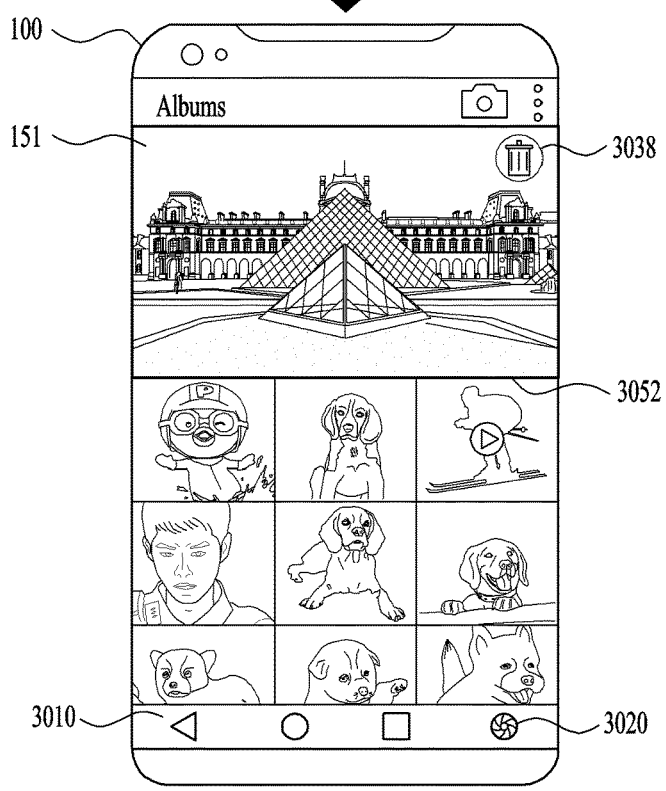

TERMINAL AND CONTROLLING METHOD THEREOF

Pursuant to 35 U.S.C. § 119(a), this application claims the benefit of earlier filing date and right of priority to Korean Application No. 10-2016-0108108, filed on Aug. 25, 2016, the contents of which are hereby incorporated by reference herein in their entirety.

BACKGROUND OF THE INVENTION

Field of the Invention

The present invention relates to a terminal, and more particularly, to a terminal and controlling method thereof. Although the present invention is suitable for a wide scope of applications, it is particularly suitable for providing AoC (Always on Camera) mode for a camera to maintain a photographable state.

Discussion of the Related Art

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Recently, it is popular to photograph a video or image using a terminal. As terminal performance is enhanced, a user can use a terminal to make a high-definition video or take a high-definition image.

Yet, for the photographing through a terminal, it is necessary to run a camera application and activate a camera module. A user needs a predetermined preparation time or a running period to perform the photographing.

However, since a scene desired to be photographed by a user passes in a very short time, the scene may be missed the moment a camera is put to face the scene after launching a camera application.

Thus, in order to capture a desired scene, it is inconvenient for a user to keep running a camera application of a camera and continue to watch a preview image.

SUMMARY OF THE INVENTION

Accordingly, embodiments of the present invention are directed to a terminal and controlling method thereof that substantially obviate one or more problems due to limitations and disadvantages of the related art.

One object of the present invention is to provide a terminal and controlling method thereof, which can provide an AoC (Always on Camera) mode for a camera to maintain a photographable state.

Another object of the present invention is to provide a terminal and controlling method thereof, which provides various photographing methods and function in AoC mode.

Further object of the present invention is to provide a terminal and controlling method thereof, by which a guide information according to a quality of an image taken in AoC mode and a user interface for checking the taken image can be provided.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal according to one embodiment of the present invention may include a display unit, a camera configured to capture an image, and a controller configured to enable an AoC (always on camera) mode for maintaining a state for the camera to capture the image, control the state for the camera to capture the image to be maintained in the enabled AoC mode, and control the camera to capture the image in the AoC mode if obtaining a shot input of capturing the image.

Preferably, the controller may control the display unit not to display a preview image of the image to be captured by the camera in the AoC mode.

Preferably, the controller may display a preview image of the image to be captured by the camera on at least one region of the display unit in the AoC mode. If obtaining the shot input, the controller may take a shot of the image corresponding to the displayed preview image.

Preferably, the controller may control the display unit to display a screen of at least one launched application in the AoC mode.

Preferably, the controller may control the display unit to display an AoC mode shot button for taking a shot of the image in the AoC mode on a prescribed region of the display unit.

More preferably, the controller may display the AoC mode shot button of an FAB (floating action button) type and display the preview image of the image to be captured by the camera on an inner region of the displayed AoC mode shot button of the FAB type.

Preferably, the controller may determine a quality of the shot image based on at least one of focus, brightness, color and blur of the shot image taken in the AoC mode. If the determined quality is below a reference quality, the controller may output a guide information on the image taken in the AoC mode.

In this case, the controller may display the outputted guide information in a manner that a menu for switching to a normal camera mode of displaying a preview image of the image captured by the camera is included in the outputted guide information.

Preferably, the controller may determine a quality of the shot image based on at least one of focus, brightness, color and blur of the shot image taken in the AoC mode and provide a user interface for handling the image below a reference quality among shot images taken in the AoC mode.

More preferably, the controller may display the image below the reference quality among the shot images taken in the AoC mode on the display unit, display a DELETE menu for deleting the image below the reference quality and a SAVE menu for saving the image below the reference quality, delete the displayed image below the reference quality if obtaining an input of selecting the displayed DELETE menu, and save the displayed image below the reference quality if obtaining an input of selecting the displayed SAVE menu.

In another aspect of the present invention, as embodied and broadly described herein, a method of operating a terminal according to another embodiment of the present invention may include enabling an AoC (always on camera) mode for maintaining a state for a camera to capture an image, obtaining a shot input of capturing the image in the enabled AoC mode, and controlling the camera to capture the image.

Preferably, the method may further include not displaying a preview image of the image to be captured by the camera in the enabled AoC mode.

Preferably, the method may further include displaying a preview image of the image to be captured by the camera in the enabled AoC mode, and the controlling the camera to capture the image may include capturing the image corresponding to the displayed preview image if obtaining the shot input.

Preferably, the method may further include displaying a screen of at least one launched application in the AoC mode.

Preferably, the method may further include displaying an AoC mode shot button for capturing the image in the AoC mode.

More preferably, the displaying the AoC mode shot button may include displaying the AoC mode shot button of an FAB (floating action button) type and displaying the preview image of the image to be captured by the camera on an inner region of the displayed AoC mode shot button of the FAB type.

Preferably, the method may further include determining a quality of the shot image based on at least one selected from the group consisting of focus, brightness, color and blur of the shot image taken in the AoC mode and outputting a guide information on the image taken in the AoC mode if the determined quality is below a reference quality.

More preferably, the outputting the guide information may include displaying a menu for switching to a normal camera mode of displaying a preview image of the image captured by the camera.

Preferably, the method may further include determining a quality of the shot image based on at least one of focus, brightness, color and blur of the shot image taken in the AoC mode and providing a user interface for handling the image below a reference quality among shot images taken in the AoC mode.

More preferably, the providing the user interface for handling the image below the reference quality may include displaying the image below the reference quality among the shot images taken in the AoC mode, displaying a DELETE menu for deleting the image below the reference quality and a SAVE menu for saving the image below the reference quality, deleting the displayed image below the reference quality if obtaining an input of selecting the displayed DELETE menu, and saving the displayed image below the reference quality if obtaining an input of selecting the displayed SAVE menu.

Accordingly, embodiments of the present invention provide various effects and/or features.

First of all, a terminal according to an embodiment of the present invention can provide AoC mode for a camera to maintain a photographable state, thereby capturing a scene desired by a user quickly.

Secondly, the present invention provides various photographing methods and functions in AoC mode, thereby enabling a user to take various images by utilizing the AoC mode.

Thirdly, the present invention provides a guide information according to a quality of an image taken in AoC mode and a user interface, whereby a low-quality image possibly generated from photographing in the AoC mode can be prevented from being taken and whereby a user can deal with the low-quality image easily.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 3 to 5 are diagrams for examples of AoC mode enablement according to various embodiments of the present invention;

FIG. 8 and FIG. 9 are diagrams for examples of AoC mode enablement and AoC mode shot button display of FAB type according to various embodiments of the present invention;

FIG. 30 is a diagram for an example of a shot image display according to various embodiments of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
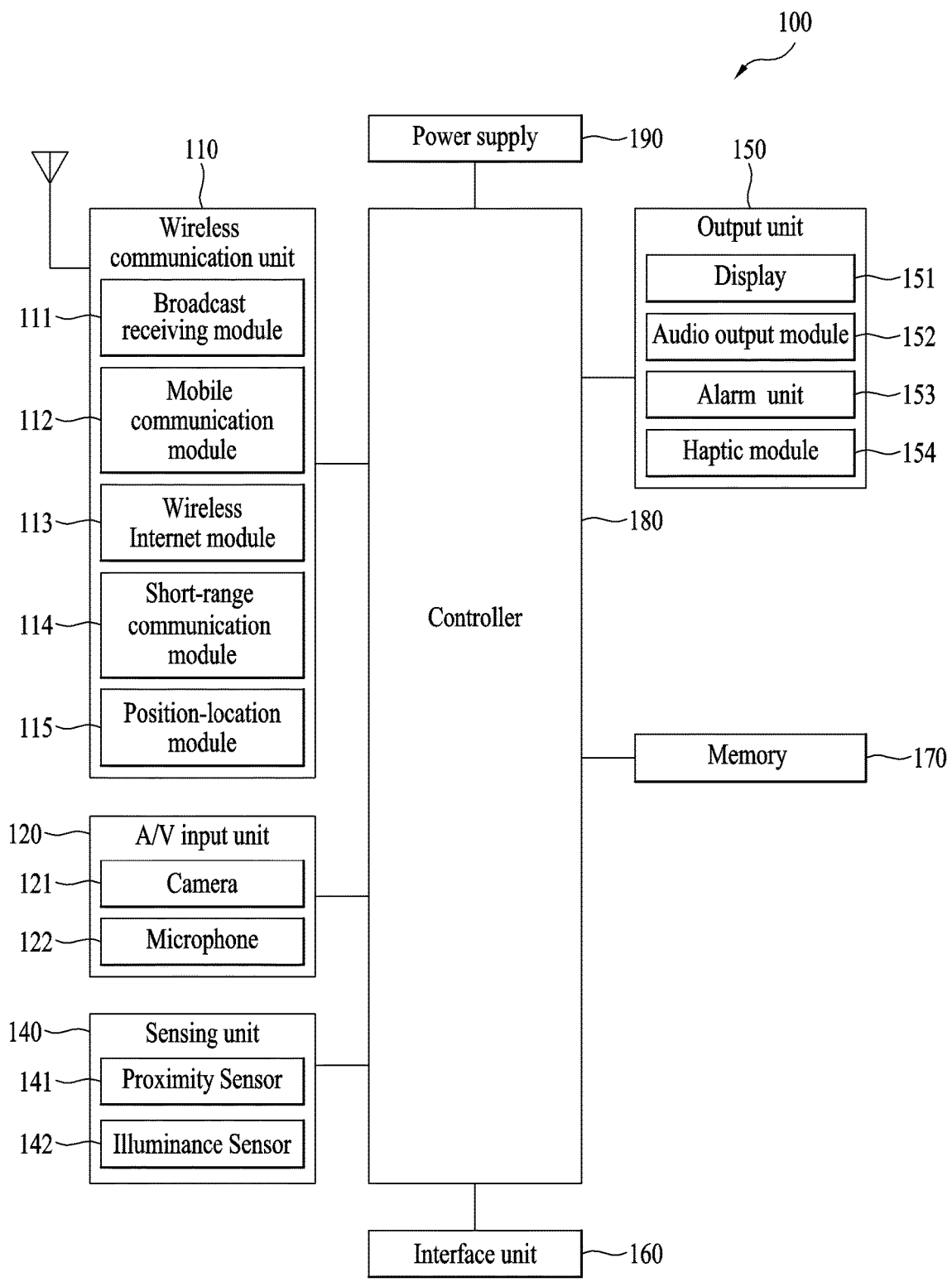
FIG. 1A is a block diagram to describe a terminal related to the present invention.
Figure 1B:
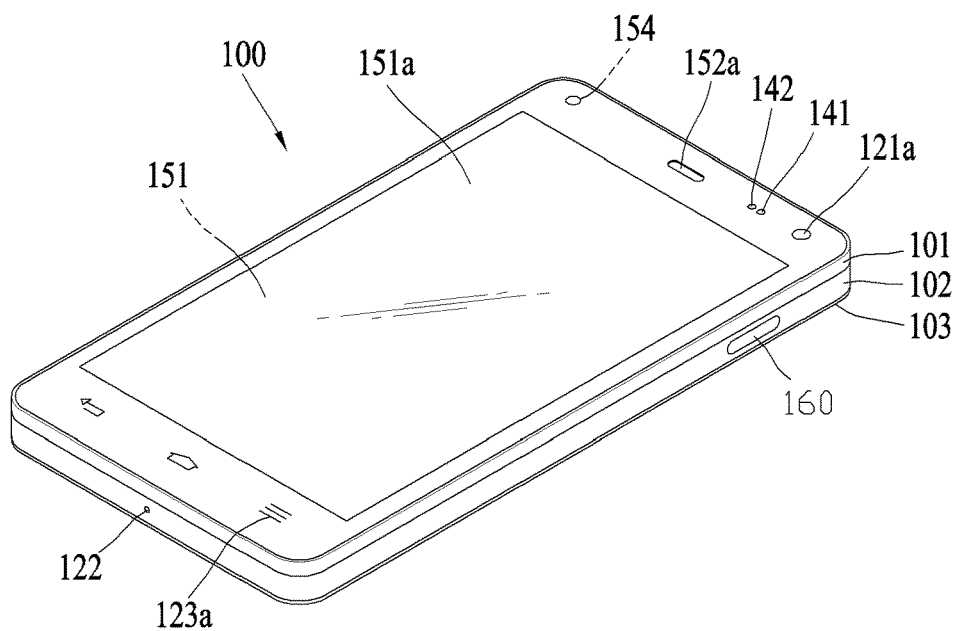
FIG. 1B and FIG. 1C are diagrams for the concept of one example of a terminal related to the present invention in different views, respectively.
Figure 1C:
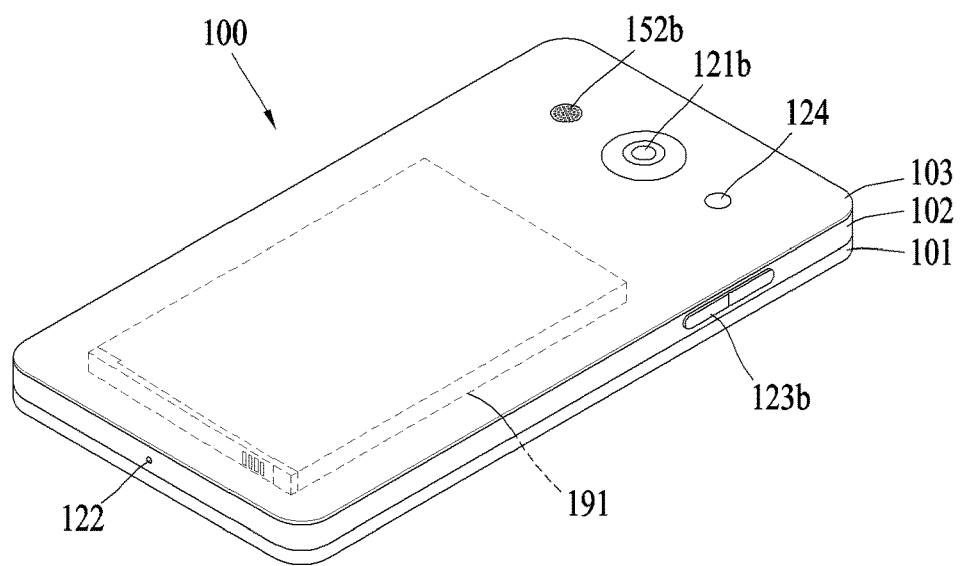

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A terminal according to various embodiments of the present invention can provide an AoC (Always on Camera) mode for a camera to maintain a photographable state, capture an image in the AoC mode, and provide various user interfaces for the captured image. In this case, the image captured by the camera may include an image or a video. In the following description, an operation of a terminal in AoC mode and a provision of a user interface for a shot image according to various embodiments of the present invention are described in detail.

Figure 2:
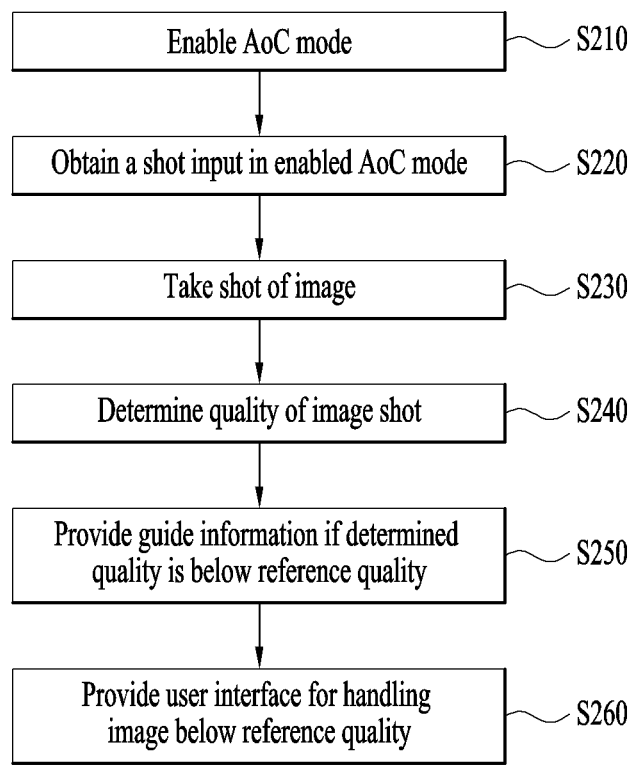
FIG. 2 is a flowchart for an operating method of a terminal according to various embodiments of the present invention.

FIG. 2 is a flowchart for an operating method of a terminal according to various embodiments of the present invention.

Referring to FIG. 2, the terminal 100 can enable an AoC mode [S210].

For instance, the controller 180 of the terminal 100 can enable the AoC mode for the camera 121 to maintain a photographable state. The AoC mode is a mode of enabling the camera to maintain a state capable of taking a shot of an image and may mean a mode of capturing an image instantly in response to a shot input. For instance, the AoC mode may mean a mode for the camera 121 to capture an image in a prescribed time in response to a shot input. And, the AoC mode may mean a mode for taking a shot of an image through the camera 121 in a state that a camera application screen is not displayed on the display unit 151. Hence, if the AoC mode is enabled, the terminal 100 does not display the camera application screen but is able to instantly take a shot of an image instantly through the camera 121 in case of obtaining a shot input. In the AoC mode, the terminal may or may not display a preview image on a prescribed region of the display unit 151

For one embodiment, in the enabled AoC mode, the terminal 100 may maintain a state that the camera 121 and a module configured to drive the camera 121 are turned on. For another embodiment, in the AoC enabled mode, the controller 180 of the terminal 100 may turn on the camera 121 and the module configured to drive the camera 121 with low current or power or maintain a state that the camera 121 and the module configured to drive the camera 121 are turned on with low current or power.

The AoC mode may be set different depending on performance of the terminal 100, the camera 121 provided to the terminal 100, performance of the module configured to drive the camera 121 and the like. For instance, if the camera 121 should maintain the turn-on state for a shot, the controller 180 can maintain the turn-on states of the camera 121 and the module configured to drive the camera 121 in the AoC mode. For another instance, if the camera 121 is able to instantly capture an image despite failing to maintain the turn-on state for a shot (i.e., a state that the camera 121 can be enabled in a prescribed time), the controller 180 can turn on the camera 121 and the module configured to drive the camera 121 in response to a shot input without maintaining the turn-on states of the camera 121 and the module configured to drive the camera 121. For further instance, in the AoC mode, the controller 180 can control the camera 121 and the module configured to drive the camera 121 to operate in standby mode for instant operations.

If AoC mode is enabled, the terminal 100 according to various embodiments can display a shot button or icon for a shot in the AoC mode on the display unit 151. If the terminal 100 obtains an input to the displayed shot button or icon in the AoC mode, the terminal 100 can take a shot of an image through the camera 121.

Detailed embodiments are described with reference to FIGS. 3 to 10 as follows.

According to one embodiment, while a camera preview screen is displayed, if the terminal 100 obtains a pinch-in input, the terminal 100 can enable AoC mode. This is described with reference to FIG. 3.

Figure 4:
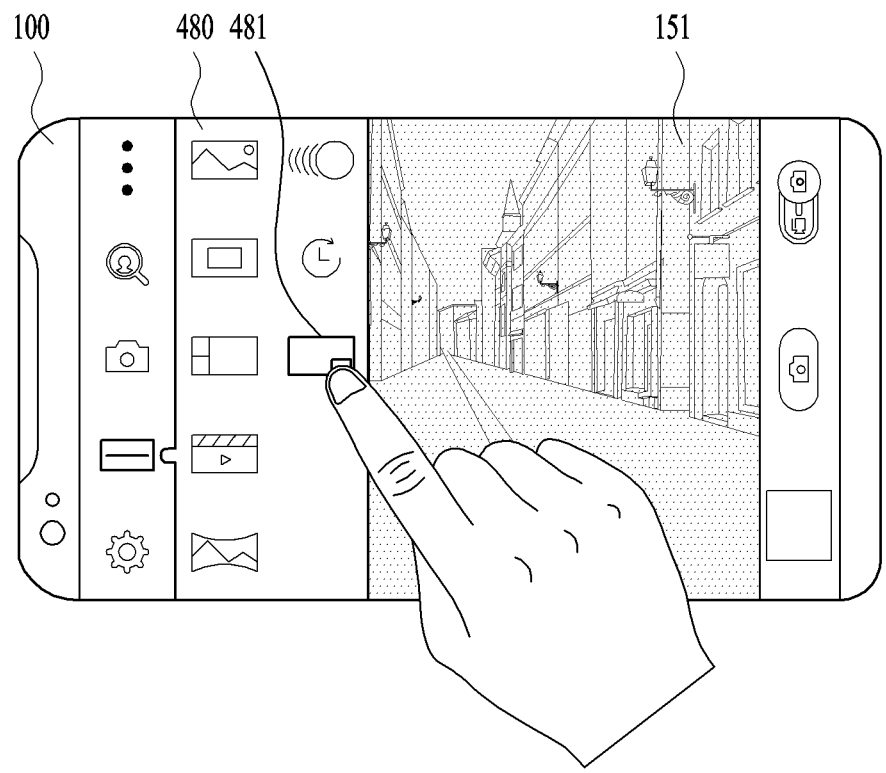
Figure 5:
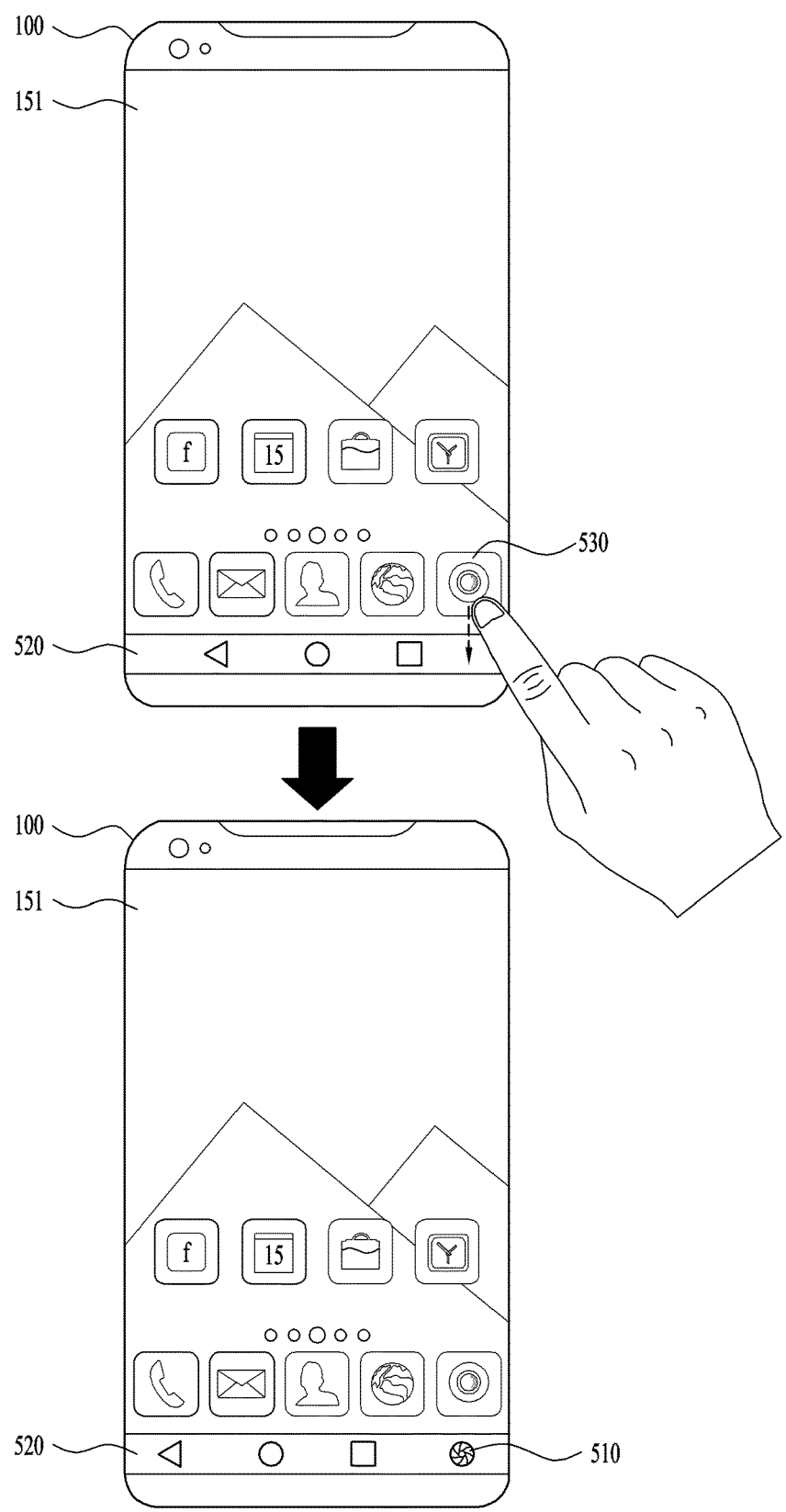

FIGS. 3 to 5 are diagrams for examples of AoC mode enablement according to various embodiments of the present invention.

Referring to FIG. 3, the controller 180 of the terminal 100 can display a camera preview screen on the display unit 151. For instance, while a camera application is running, the controller 180 can display a preview screen, which displays a preview image of an image captured by the camera 121, on the display unit 151. The controller 180 can obtain an input of pinching in a prescribed region of the preview screen. In doing so, the preview screen may be in a state of displaying an image of a minimum magnification that can be captured by the camera 121. In response to the applied pinch-in input, the controller 180 can enable an AoC mode. In the enabled AoC mode, the controller 180 can display an AoC mode shot button 310 for taking a shot of an image through the camera 121. For instance, the controller 180 can display the AoC mode shot button 310 on a navigation bar 320 displayed on a prescribed region of the display unit 151.

According to another embodiment, the terminal can obtain an AoC mode enablement input from a setting menu of a camera application screen and is then able to enable an AoC mode. This is described with reference to FIG. 4 as follows.

Referring to FIG. 4, the controller 180 of the terminal 100 runs a camera application and is able to display a camera application screen on the display unit 151. The controller 180 can display a camera menu 480 on a prescribed region of the camera application screen. For instance, the camera menu 480 may include various menus related to camera functions. For instance, the camera menu 480 may include an AoC menu 481 for enabling an AoC mode. The controller 180 can obtain an input of selecting the AoC menu 481 from the displayed camera menu 480 and is able to enable the AoC mode. In the enabled AoC mode, the controller 180 can display an AoC mode shot button for taking a shot of an image through the camera 121.

According to further embodiment, the terminal 100 can enable the AoC mode in response to an input to a camera application icon. This is described with reference to FIG. 5 as follows.

Referring to FIG. 5, the controller 180 of the terminal 100 can display a camera application icon 530 and a navigation bar 520 on the display unit 151. The controller 180 can obtain an input of dragging the camera application icon 530 to the navigation bar 520. In response to the obtained drag input, the controller 180 can enable the AoC mode. The controller 180 can display an AoC mode shot button 510 on the navigation bar 520 displayed on a prescribed region of the display unit 151.

Meanwhile, the terminal 100 according to various embodiments of the present invention may remove the AoC mode shot button in response to an input to the displayed AoC mode shot button or display an AoC mode shot button of FAB (floating action button) type. This is described with reference to FIG. 6 and FIG. 7 as follows.

Figure 6:
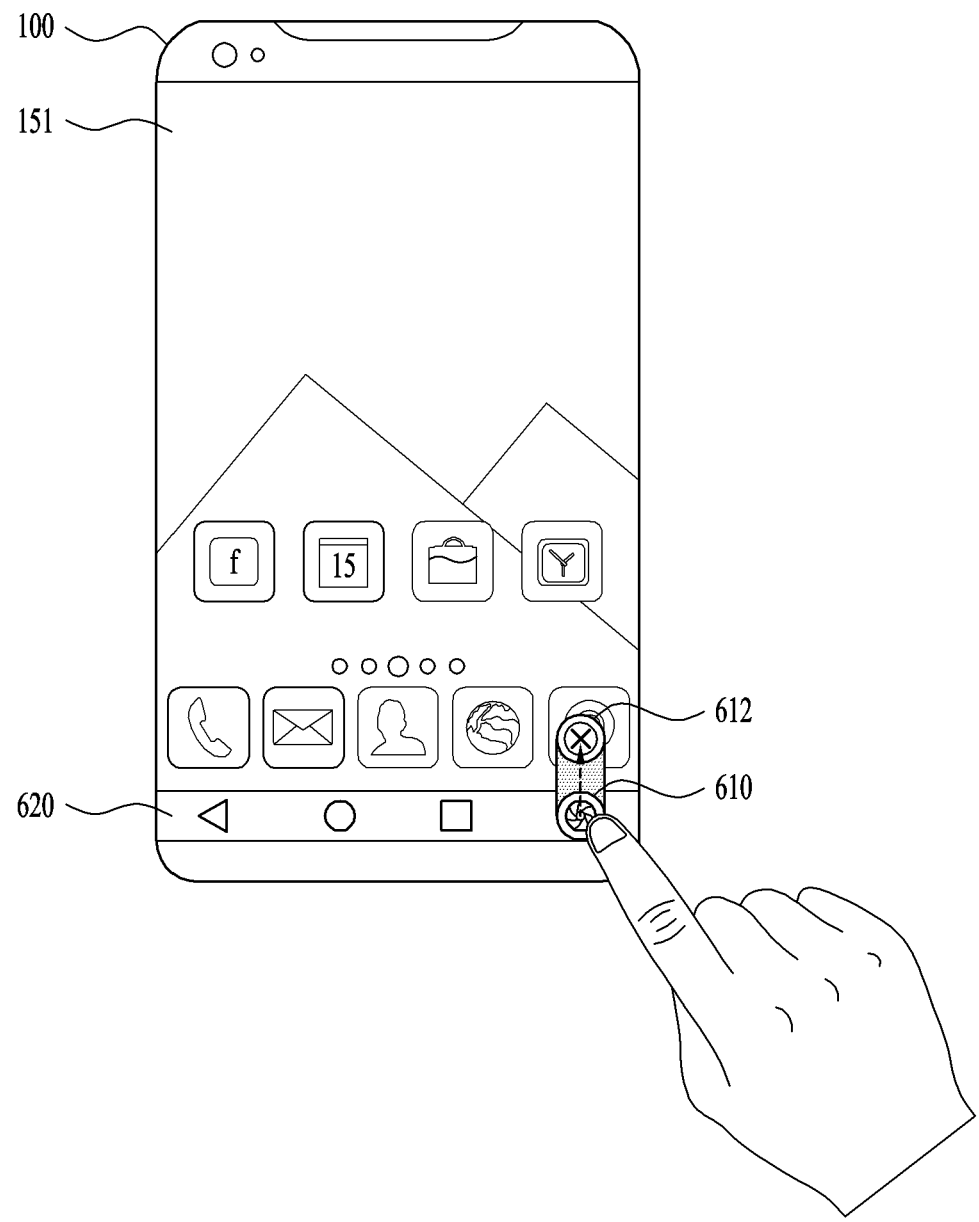
FIG. 6 is a diagram for an example of AoC mode shot button removal according to various embodiments of the present invention.

FIG. 6 is a diagram for an example of AoC mode shot button removal according to various embodiments of the present invention.

Referring to FIG. 6, in AoC mode, the controller 180 can display an AoC mode shot button 610 on a prescribed region of the display unit 151 (e.g., a navigation bar 620). The controller 180 can obtain an input of dragging the AoC mode shot button 610 in a prescribed direction (e.g., a top direction). If the drag input is applied over a predetermined distance, the controller 180 can display a REMOVE button 612 for removing the AoC mode shot button 610. In this case, the REMOVE button 612 may be a guide for removing the AoC mode shot button 612. If obtaining an input of selecting the displayed REMOVE button 612, the controller 180 can remove the AoC mode shot button 610. Moreover, if obtaining an input of dragging & dropping the AoC mode shot button 610 onto the REMOVE button 612, the controller 180 can remove the AoC mode shot button 610.

Figure 7:
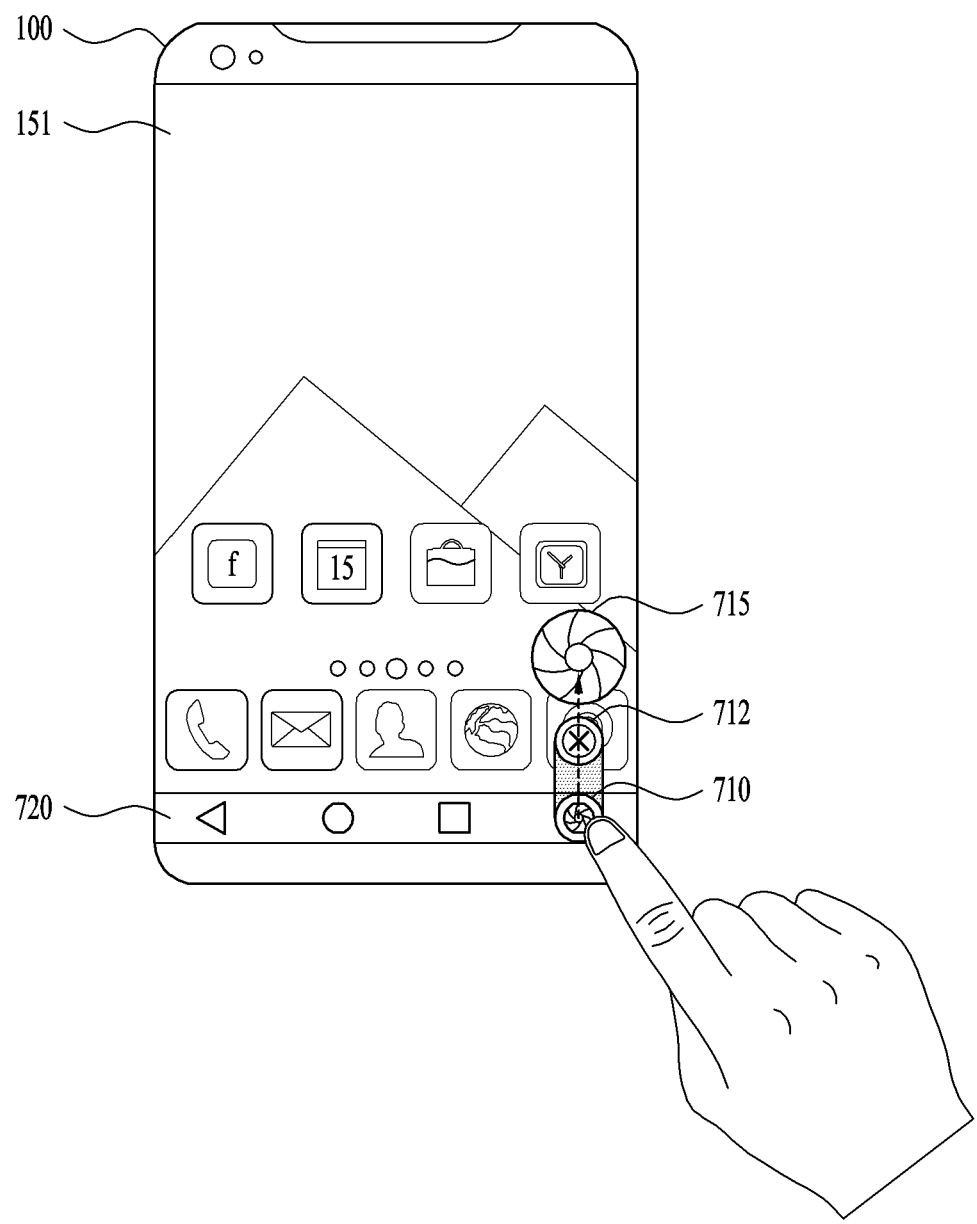
FIG. 7 is a diagram for an example of AoC mode shot button display of FAB type according to various embodiments of the present invention.

FIG. 7 is a diagram for an example of AoC mode shot button display of FAB type according to various embodiments of the present invention.

Referring to FIG. 7, in AoC mode, the controller 180 can display an AoC mode shot button 710 on a prescribed region of the display unit 151 (e.g., a navigation bar 720). The controller 180 can obtain an input of dragging the AoC mode shot button 710 in a prescribed direction (e.g., a top direction). If the drag input is applied over a predetermined distance, the controller 180 can display a REMOVE button 712 for removing the AoC mode shot button 710. If obtaining an input of dragging the AoC mode shot button 710 over a location at which the REMOVE button 712 is displayed, the controller 180 can display an AoC mode shot button 715 of FAB (floating action button) type. In response to a user input, the displayed AoC mode shot button 715 of the FAB type can be moved to another location on the display unit 151. For instance, in response to a drag input to the AoC mode shot button 715 of the FAB type, the controller 180 can move a location of the displayed AoC mode shot button 715 of the FAB type. Meanwhile, if obtaining an input to the AoC mode shot button 715 of the FAB type, the controller 180 can take a shot of an image through the camera 121. And, the controller 180 may display a preview image of an image captured by the camera 121 on an inner region of the AoC mode shot button 715 of the FAB type. This shall be described later.

According to further embodiment, the terminal 100 can enable an AoC mode if obtaining a pinch-in input in the course of displaying a camera preview screen and is able to display the aforementioned FAB type AoC mode shot button. This is described with reference to FIG. 8 and FIG. 9 as follows.

FIG. 8 and FIG. 9 are diagrams for examples of AoC mode enablement and AoC mode shot button display of FAB type according to various embodiments of the present invention.

Referring to FIG. 8, the controller 180 of the terminal 100 can display a camera preview screen on the display unit 151. For instance, while a camera application is running, the controller 180 can display a preview screen of displaying a preview image of an image captured by the camera 121 on the display unit 151. The controller 180 can obtain an input of pinching in a prescribed region of the preview screen. In this case, the preview screen may be in a state of displaying an image of a minimum magnification that can be captured by the camera 121. In response to the obtained pinch-in input, the controller 180 can enable an AoC mode. In the enabled AoC mode, the controller 180 removes the preview screen and is able to display an AoC mode shot button 815 of FAB type. The controller 180 can display a preview image on an inner region of the displayed AoC mode shot button 815 of the FAB type. In response to an input to the AoC mode shot button 815 of the FAB type, the controller 180 can take a shot of an image through the camera 121.

Referring to FIG. 9, the controller 180 of the terminal 100 can display a camera preview screen 940 on a prescribed region of the display unit 151. For instance, while a camera application is running, the controller 180 can display a preview screen 940 of displaying a preview image of an image captured by the camera 121 on the prescribed region of the display unit 151. The controller 180 can obtain an input of pinching in a prescribed region of the preview screen. In this case, the preview screen may be in a state of displaying an image of a minimum magnification that can be captured by the camera 121. In response to the obtained pinch-in input, the controller 180 can enable an AoC mode. In the enabled AoC mode, the controller 180 removes the preview screen and is able to display an AoC mode shot button 915 of FAB type. In response to an input to the AoC mode shot button 915 of the FAB type, the controller 180 can take a shot of an image through the camera 121.

Thus, the terminal 100 enables the AoC mode and is able to display the AoC mode shot button of the FAB type. And, the terminal 100 may display a preview screen on an inner region of the displayed FAB type AoC mode shot button.

In response to an input of moving the displayed FAB type AoC mode shot button, the terminal 100 according to various embodiments of the present invention can display it at the moved location. If obtaining an input of moving the FAB type AoC mode shot button to the navigation bar, the controller 180 removes the FAB type AoC mode shot button and is able to display the aforementioned AoC mode shot button. This is described with reference to FIG. 10 as follows.

Figure 10:
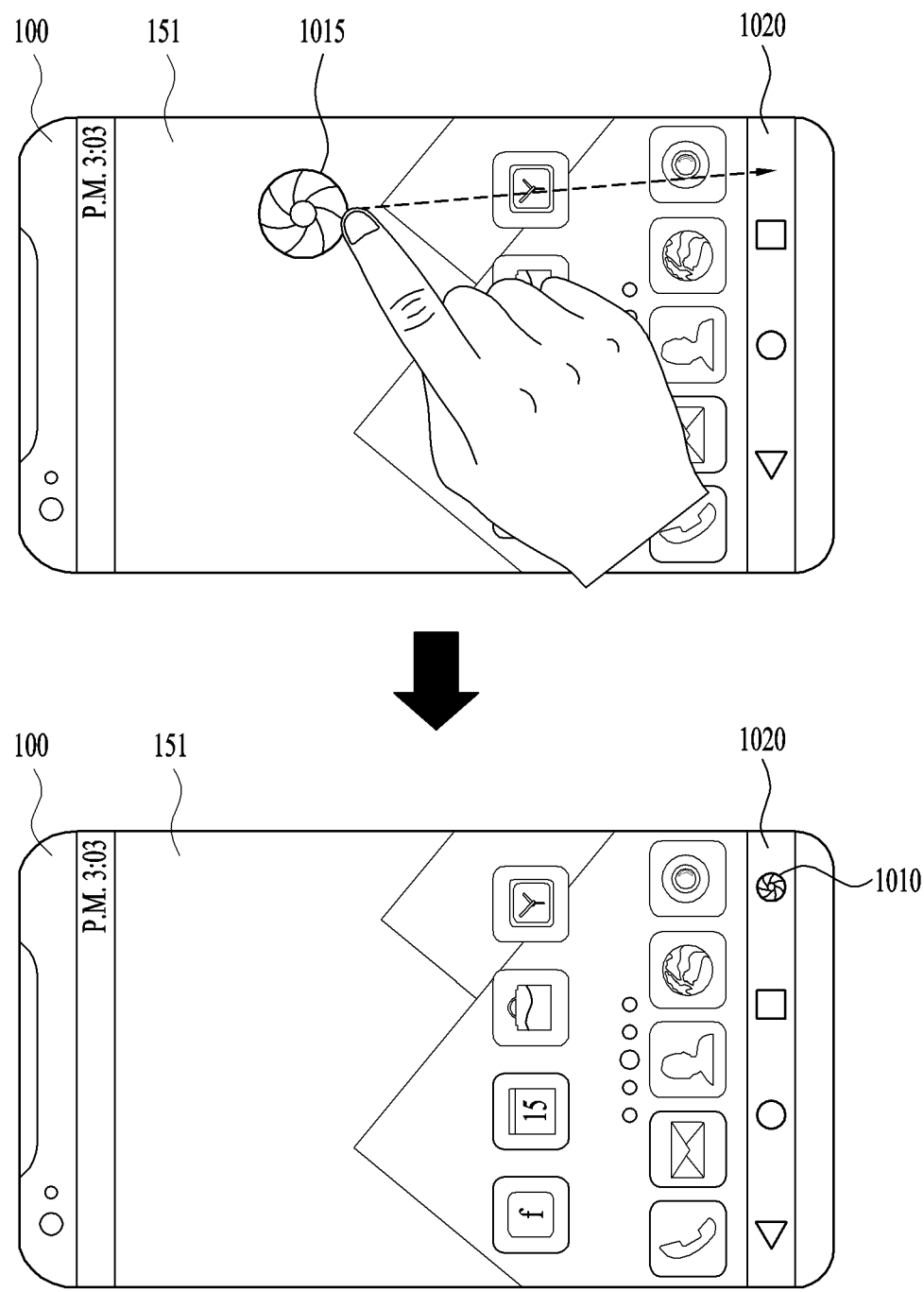
FIG. 10 is a diagram for an example of AoC mode shot button display according to various embodiments of the present invention.

FIG. 10 is a diagram for an example of AoC mode shot button display according to various embodiments of the present invention.

Referring to FIG. 10, the terminal 100 enables an AoC mode and is able to display an AoC mode shot button 1015 of FAB type on a prescribed region of the display unit 151. The controller 180 may obtain an input of moving the FAB type AoC mode shot button 1015 to a navigation bar 1020. For instance, the controller 180 can obtain an input of dragging and dropping the FAB type AoC mode shot button 1015 onto the navigation bar 1020. If obtaining the input of dragging and dropping the FAB type AoC mode shot button 1015 onto the navigation bar 1020, the controller 180 removes the FAB type AoC mode shot button 1015 and is able to display an AoC mode shot button 1010 on the navigation bar 1020.

FIG. 2 is referred to again.

Referring now to FIG. 2, in the enabled AoC mode, the terminal 100 can obtain a shot input [S220]. In response to the obtained shot input, the terminal 100 can take a shot of an image through the camera 121 [S230].

For instance, in the enabled AoC mode, the controller 180 can obtain a shot input of inputting the displayed AoC mode shot button. In response to the obtained shot input, the controller 180 can take a shot of an image through the camera 121 instantly. Meanwhile, the controller 180 may or may not display a preview image in AoC mode. Moreover, the controller 180 may display the image taken in the AoC mode on the display unit 151 for a predetermined time. This is described with reference to FIG. 11 and FIG. 20 as follows.

Figure 11:
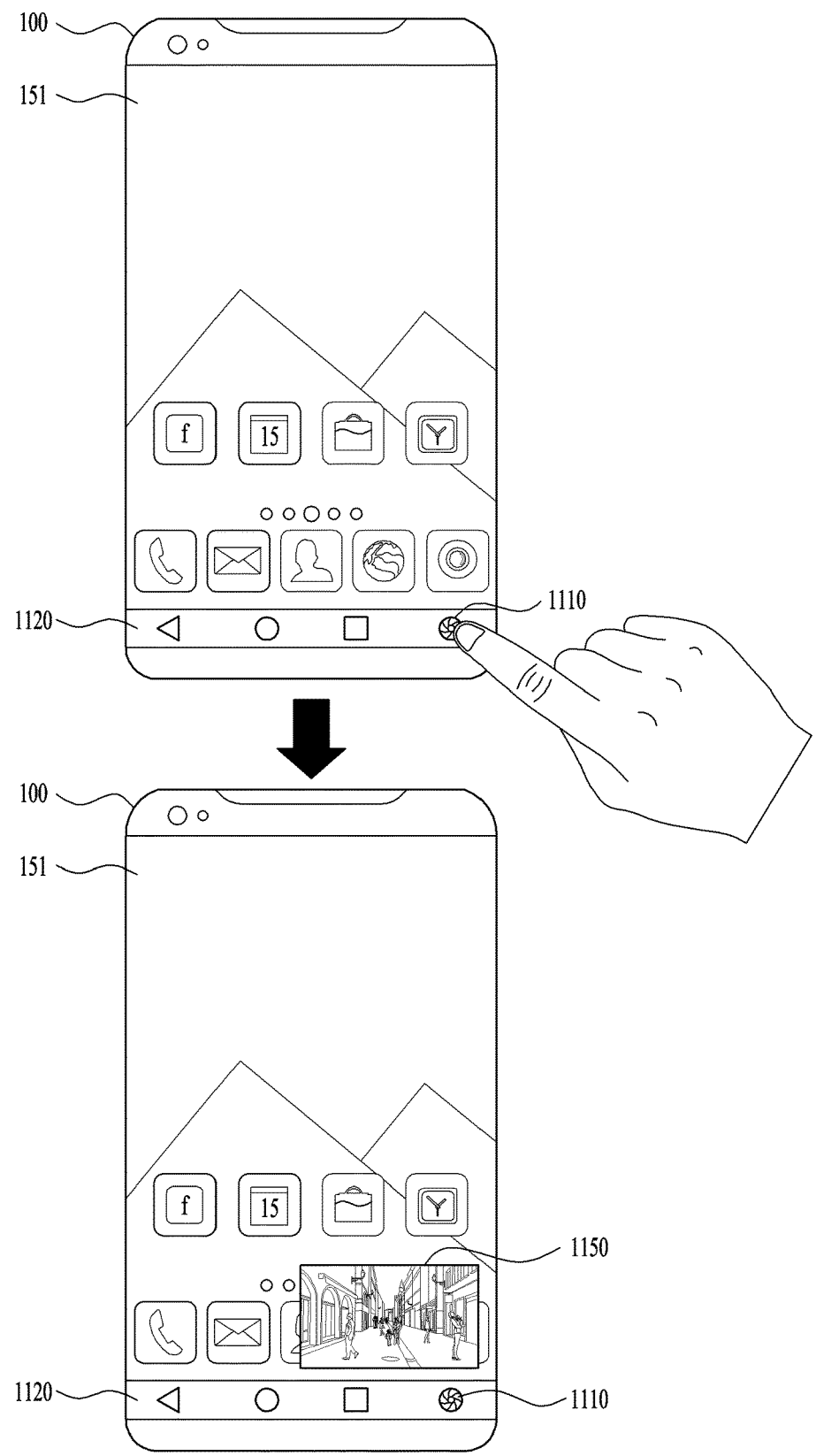
FIG. 11 is a diagram for an example of an image shot in AoC mode according to various embodiments of the present invention.

FIG. 11 is a diagram for an example of an image shot in AoC mode according to various embodiments of the present invention.

Referring to FIG. 11, the terminal 100 can display an AoC mode shot button 1110 on a prescribed region of the display unit 151. For instance, the controller 180 can display the AoC mode shot button 1110 on a navigation bar 1120. If obtaining an input of touching the AoC mode shot button 1110, the controller 180 can take a shot of an image through the camera 121. The controller 180 may display a shot image 1150 on a prescribed region of the display unit 151 for a prescribed time. If the prescribed time expires, the controller 180 may remove the displayed shot image 1150. In doing so, the controller 180 may display the shot image 1150 as a semitransparent image on the display unit 151. Only if an shot image is taken without a preview image, the controller 180 may display the shot image 1150 on the display unit 151. Hence, if obtaining a shot input while the preview image is displayed, the controller 180 only takes a shot of an image through the camera 121 but may not display the shot image on the display unit 151. On the other hand, if obtaining a shot input while the preview image is not displayed, the controller 180 takes a shot of an image through the camera 121 and may display the shot image on the display unit 151.

Meanwhile, the terminal 100 can display a plurality of images, which are unchecked by a user among images taken in AoC mode, on a prescribed region of the display unit 151. For instance, after a shot operation in AoC mode, the controller 180 can display at least one image, which is unchecked by a user among images taken in AoC mode, on the display unit 151. After the shot operation in AoC mode, the controller 180 may display at least one image, which is unchecked by a user after being taken in a state that a preview image is not displayed among images taken in AoC mode, on the display unit 151. This is described with reference to FIG. 12 as follows.

Figure 12:
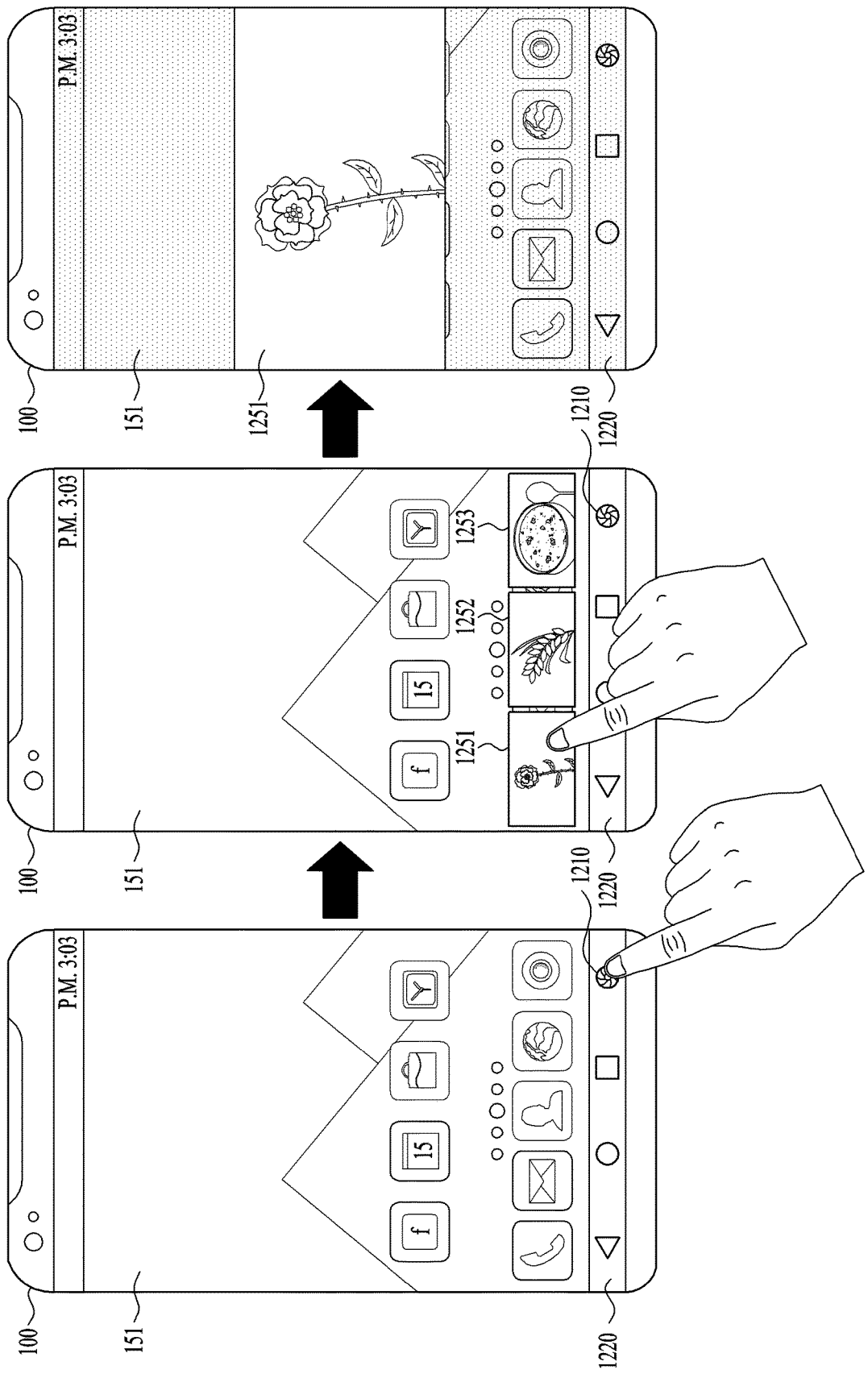
FIG. 12 is a diagram for an example of a shot image display according to various embodiments of the present invention.

FIG. 12 is a diagram for an example of a shot image display according to various embodiments of the present invention.

Referring to FIG. 12, the terminal 100 can display an AoC mode shot button 1210 on a prescribed region of the display unit 151. For instance, the controller 180 can display the AoC mode shot button 1210 on a navigation bar 1220. If obtaining an input of touching the AoC mode shot button 1210, the controller 180 can take a shot of an image through the camera 121. After the shot, the controller 180 can display a plurality of images 1251 to 1253, which are unchecked by a user after being taken in AoC mode without preview image display, on a prescribed region of the display unit 151. The controller 180 may display a plurality of the displayed images 1251 to 1253 semitransparently. If obtaining an input of selecting at least one of a plurality of the images 1251 to 1253, the controller 180 can display the selected image 1251 on a full screen of the display unit 151. For instance, the controller 180 runs a gallery application for displaying shot images and is able to display the selected image 1251 on a gallery application screen. If obtaining a flicking input in a prescribed direction to the displayed image 1251, the controller 180 can display another image unchecked by a user by being taken without a preview image display in AoC mode. The controller 180 may display images, which are unchecked by a user by being taken without preview image display in AoC mode, on the gallery application screen only.

In AoC mode, the terminal 100 according to various embodiments of the present invention can display a preview image and take a shot of an image in response to a shot input.

Figure 13:
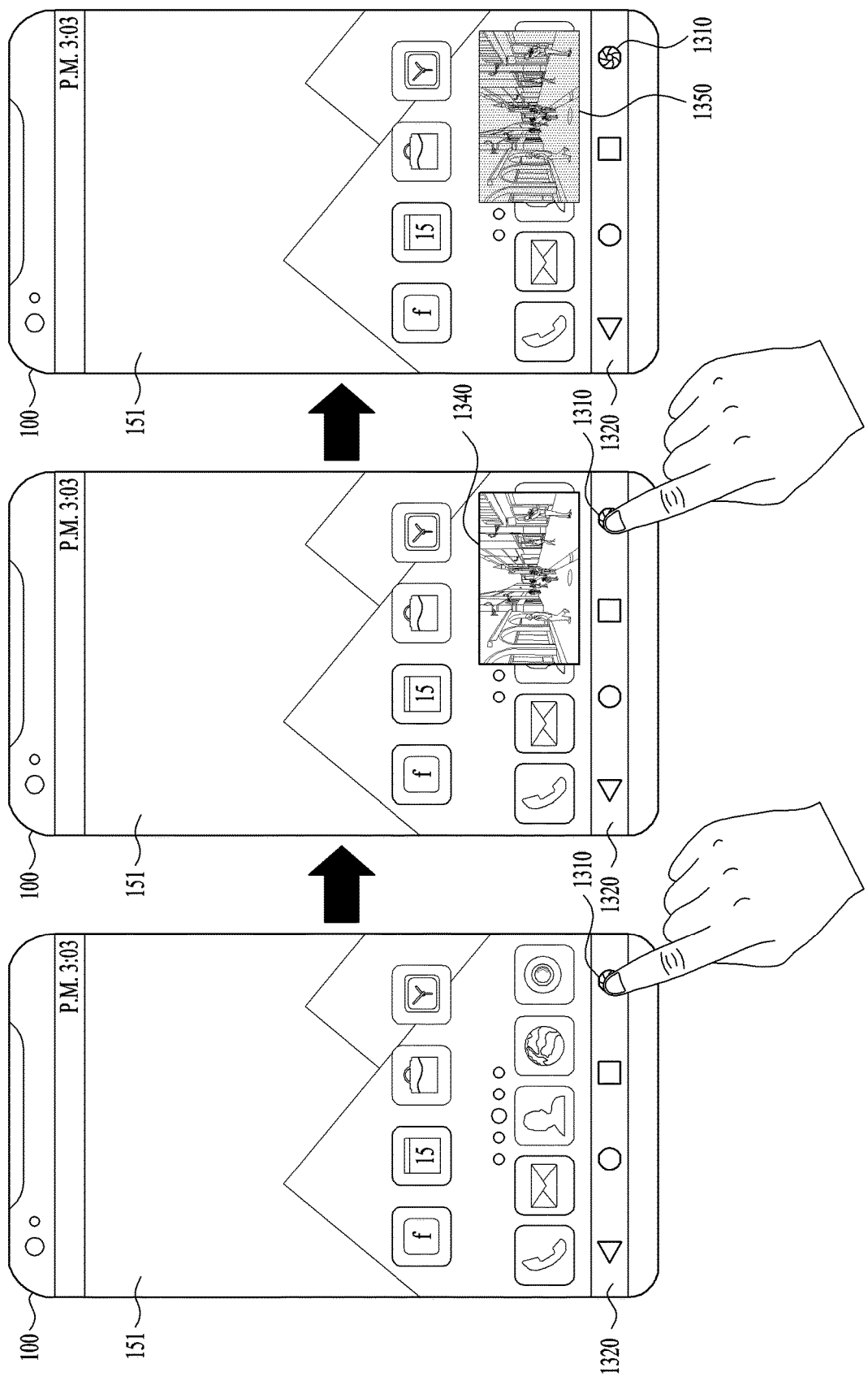
FIG. 13 is a diagram for an example of a preview image display and an image shot according to various embodiments of the present invention.

FIG. 13 is a diagram for an example of a preview image display and an image shot according to various embodiments of the present invention.

Referring to FIG. 13, the controller 180 can display an AoC mode shot button 1310 on a prescribed region of the display unit 151 (e.g., a navigation bar 1320). The controller 180 can obtain an input of long touching the displayed AoC mode shot button 1310. If the long-touched input is maintained, the controller 180 can display a preview image 1340 on a prescribed region of the display unit 151. If the input of touching the AoC mode shot button 1310 is not maintained, the controller 180 can take a shot of an image displayed in the preview image 1340. For instance, if a finger touching the AoC mode shot button 1310 is detached from the display unit 151, the controller 180 can take a shot of an image through the camera 121. The controller 180 can display a shot image 1350 on a prescribed region of the display unit 151 for a predetermined time and may display the shot image 1350 semitransparently.

If obtaining an input to a shot image displayed on the display unit 151, the terminal 100 according to various embodiments of the present invention can display the shot image on a full or predetermined region of the display unit 151.

Figure 14:
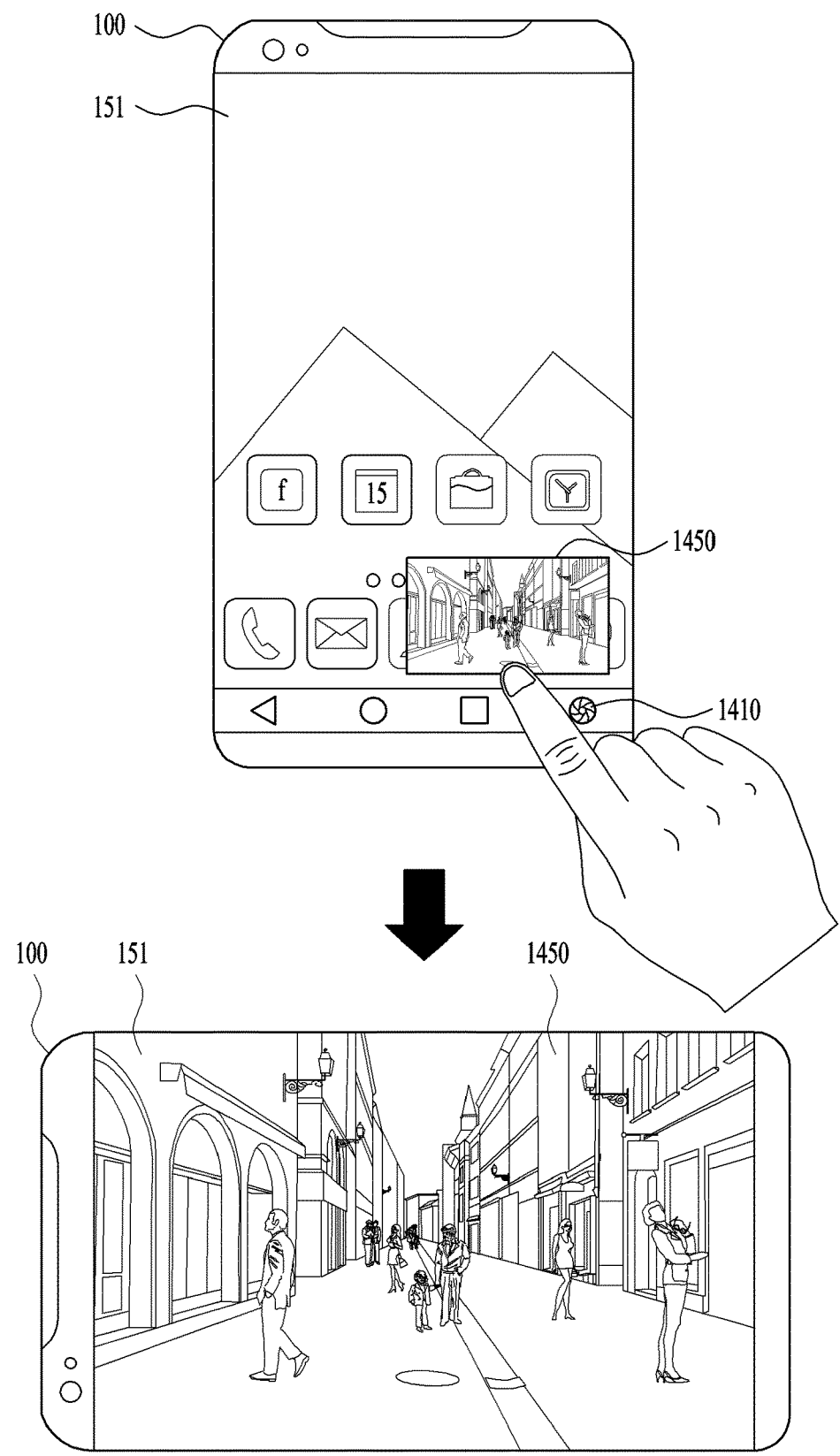
FIG. 14 is a diagram for an example of a shot image display according to various embodiments of the present invention.

FIG. 14 is a diagram for an example of a shot image display according to various embodiments of the present invention.

Referring to FIG. 14, the controller 180 can display a shot image 1450 taken in AoC mode on a prescribed region of the display unit 151. For one embodiment, the controller 180 may display the shot image 1450 semitransparently for a predetermined time. If obtaining an input of selecting the displayed image 1450, the controller 180 can display the selected image 1450 on a full region of the display unit 151.

For instance, the controller 180 can display the selected image 1450 on a gallery application screen.

In AoC mode, the terminal 100 according to various embodiments of the present invention can display a preview image or may display a plurality of preview images depending on an input.

Figure 15:
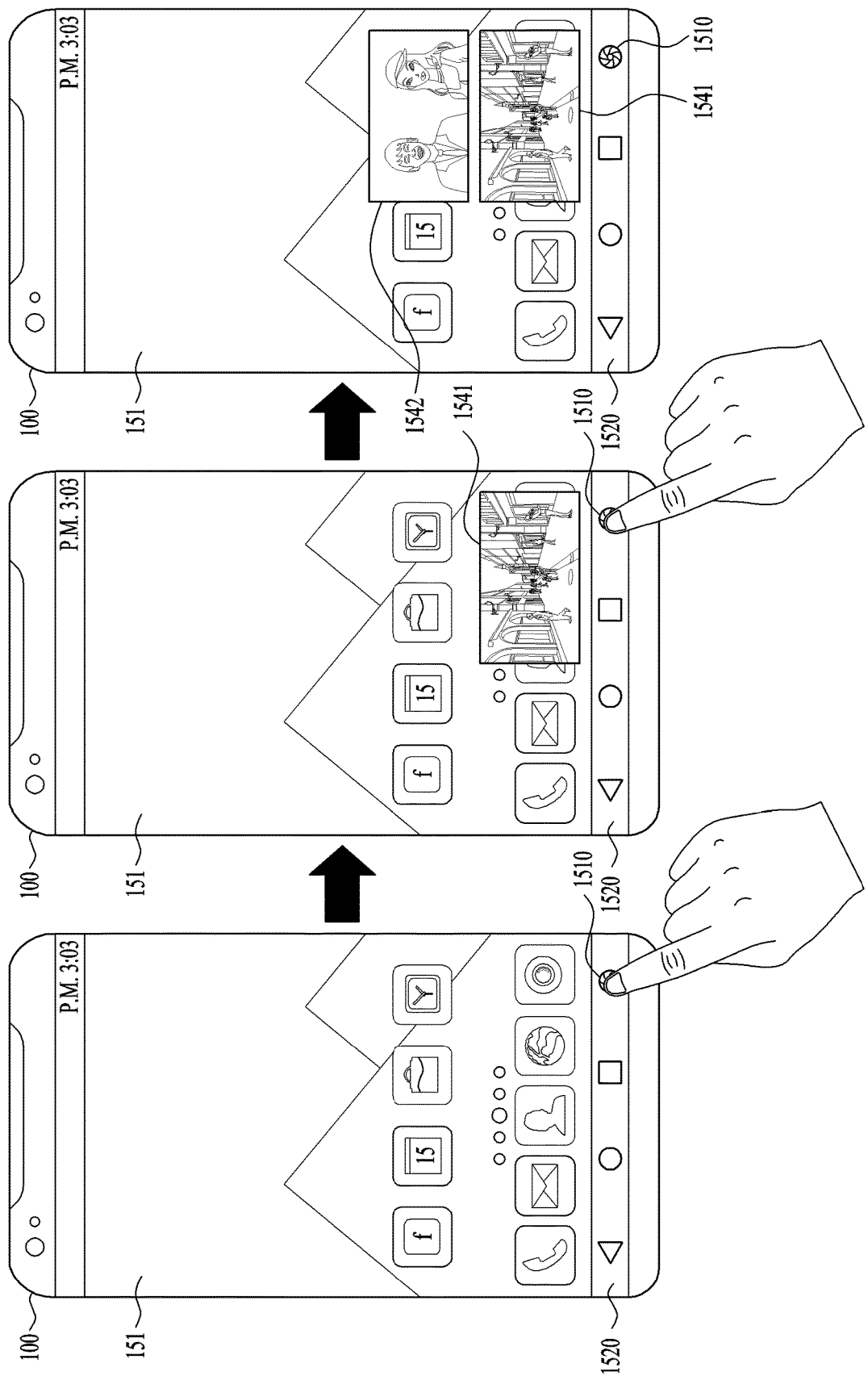
FIG. 15 is a diagram for an example of displaying a plurality of preview images according to various embodiments of the present invention.

FIG. 15 is a diagram for an example of displaying a plurality of preview images according to various embodiments of the present invention.

Referring to FIG. 15, the controller 180 can display an AoC mode shot button 1510 on a prescribed region of the display unit 151 (e.g., a navigation bar 1520). The controller 180 can obtain an input of applying a force touch to the displayed AoC mode shot button 1510 and is able to display a first preview image 1541 corresponding to the second camera 121b. In this case, the force touch means a touch input of applying a touch with a force over a predetermined size. While the first preview image 1541 is touched, if the controller 180 obtains the input of applying the force touch to the AoC mode shot button 1510 one more time, the controller 180 can display a second preview image 1542 corresponding to the first camera 121a.

Figure 16:
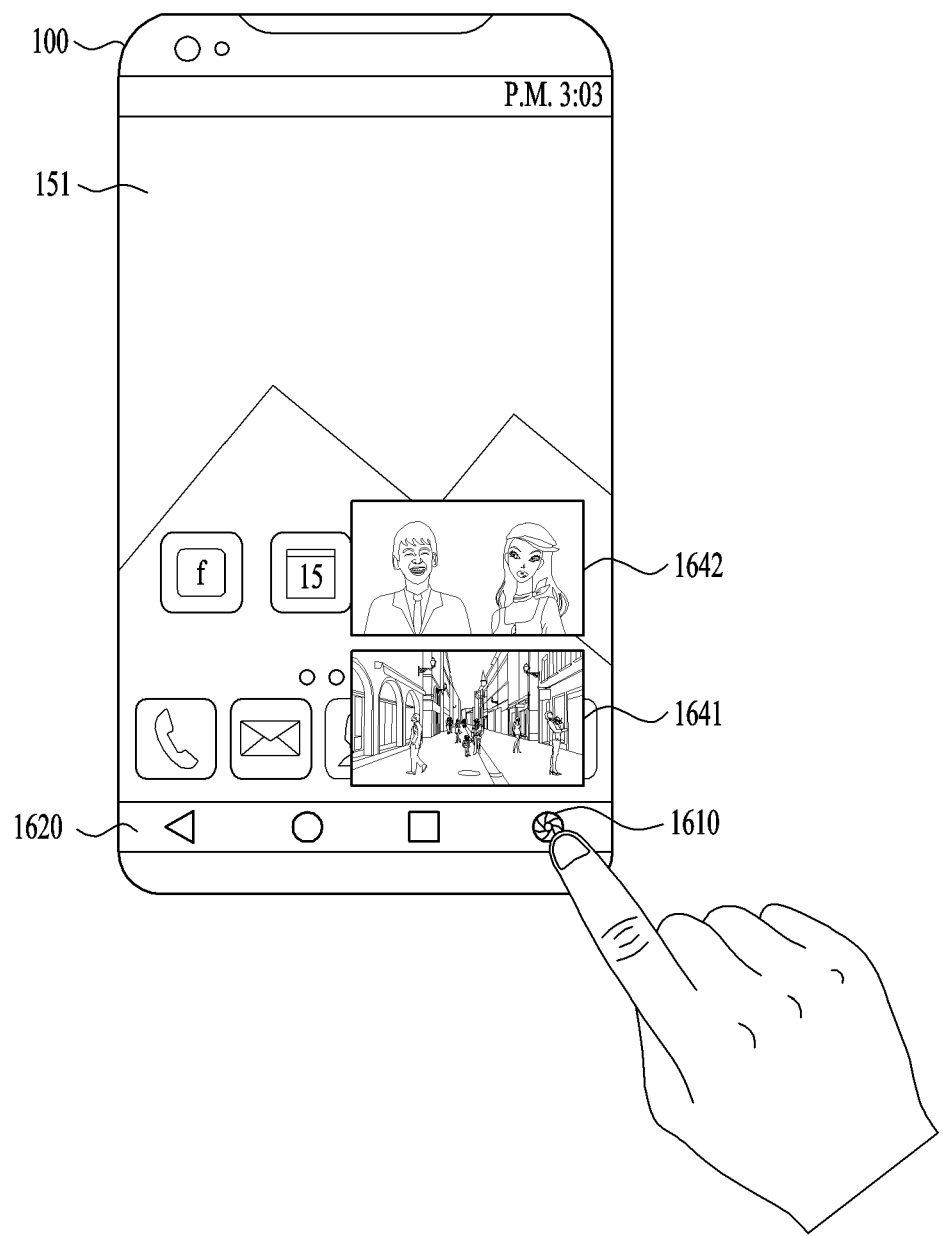
FIG. 16 and FIG. 17 are diagrams for an example of an image shot according to various embodiments of the present invention.
Figure 17:
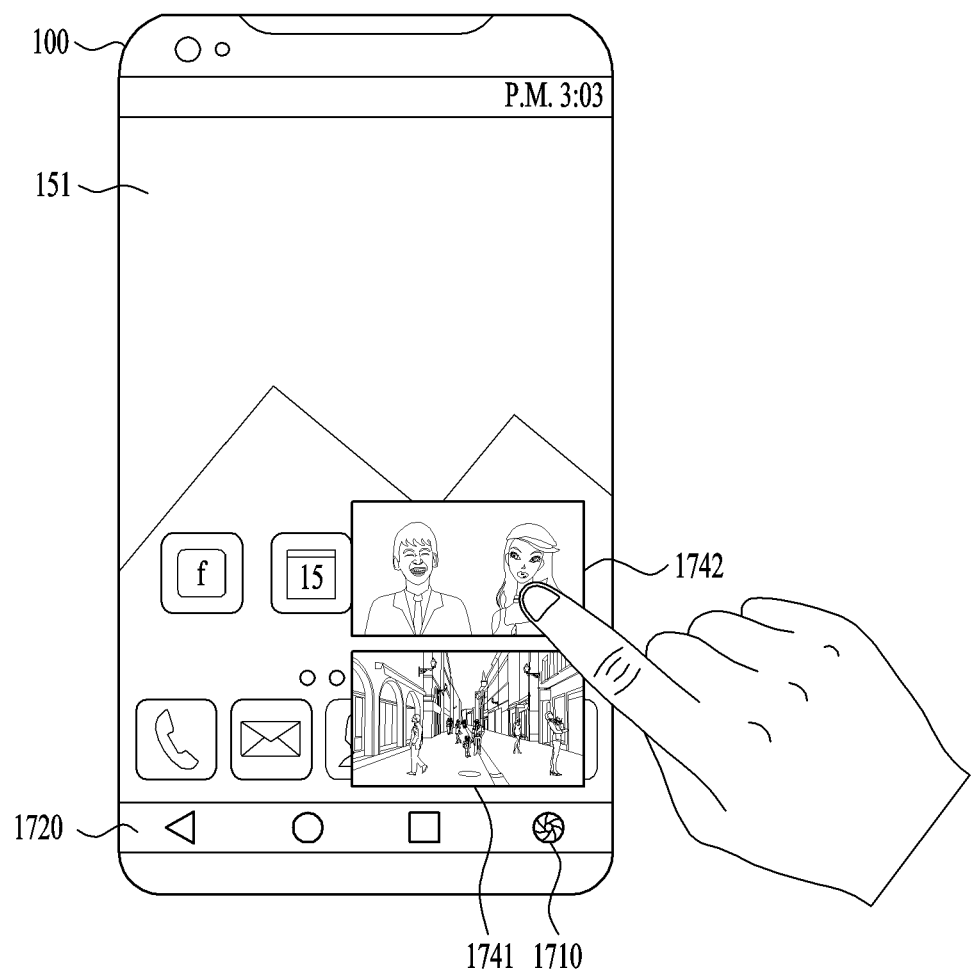

FIG. 16 and FIG. 17 are diagrams for an example of an image shot according to various embodiments of the present invention.

Referring to FIG. 16, the controller 180 can display a first preview image 1641 and a second preview image 1642 on a prescribed region of the display unit 151. In this case, the first preview image 1641 and the second preview image 1642 may correspond to the second camera 121b and the first camera 121a, respectively. The controller 180 may obtain a touch input to a prescribed region of the display unit 151 (e.g., an AoC mode shot button 1610 displayed on a navigation bar 1620). In response to the obtained input, the controller 180 can take shots of images corresponding to the first preview image 1641 and the second preview image 1642 (e.g., a shot image taken through the second camera 121b and a shot image taken through the first camera 121a).

Referring to FIG. 17, the controller 180 can display a first preview image 1741 and a second preview image 1742 on a prescribed region of the display unit 151. In this case, the first preview image 1741 and the second preview image 1742 may correspond to the second camera 121b and the first camera 121a, respectively. The controller 180 may obtain an input of touching the displayed second preview image 1742 and is able to take a shot of an image corresponding to the second preview image 1742 (e.g., a shot image taken through the first camera 121a) in response to the obtained input. Thus, the terminal 100 can take a shot of an image through a camera corresponding to a selected preview image in response to an input to a displayed preview image.

Figure 18:
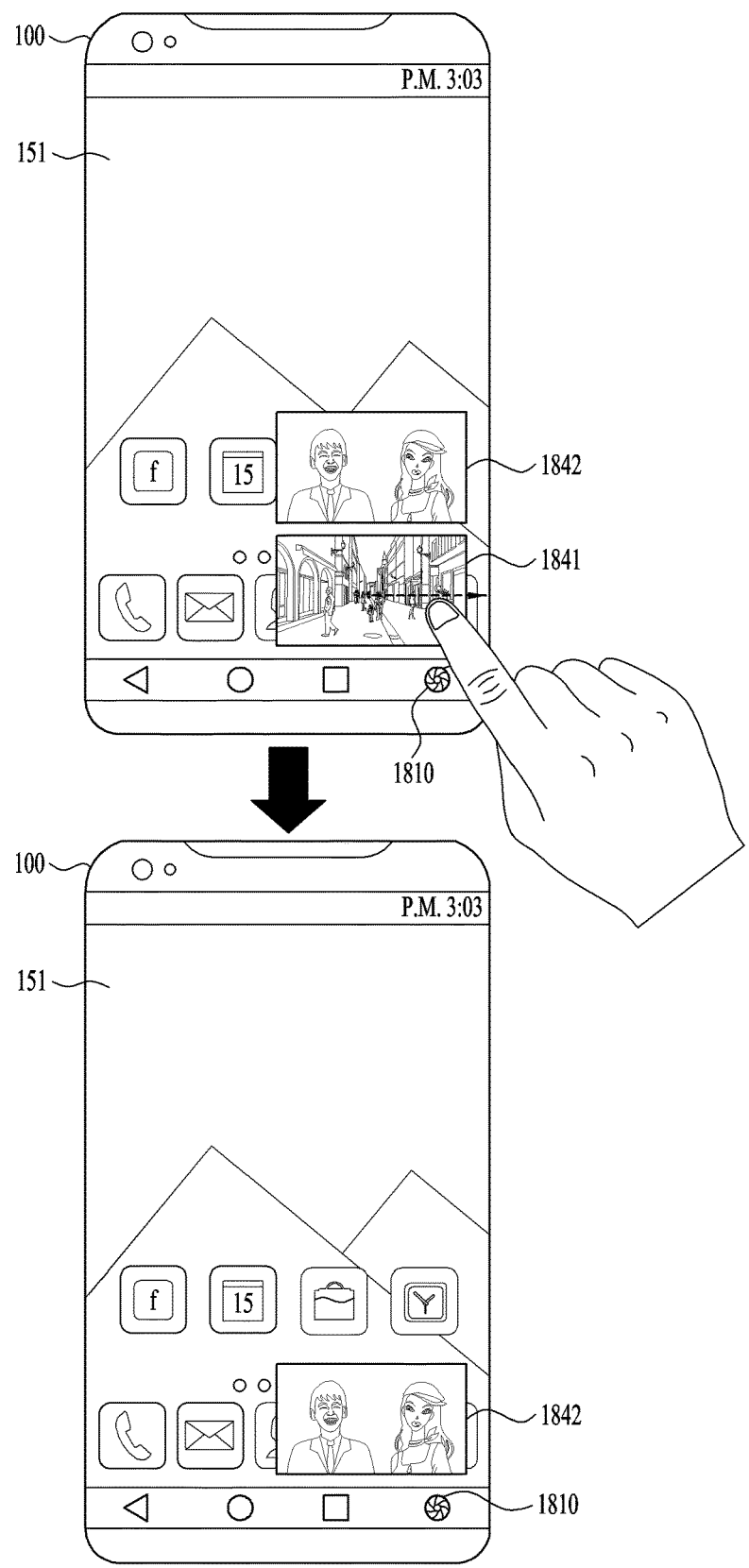
FIG. 18 is a diagram for an example of a preview image deletion according to various embodiments of the present invention.

FIG. 18 is a diagram for an example of a preview image deletion according to various embodiments of the present invention.

Referring to FIG. 18, the controller 180 can display a first preview image 1841 and a second preview image 1842 on a prescribed region of the display unit 151. In this case, the first preview image 1841 and the second preview image 1842 may correspond to the second camera 121b and the first camera 121a, respectively. The controller 180 may obtain an input for removing one of the displayed preview images 1841 and 1842 and is able to remove the preview image corresponding to the obtained input. For instance, the controller 180 can obtain an input of swiping the displayed first preview image 1841 in a right direction and is able to remove the first preview image 1841 in response to the obtained input. And, the controller 180 may display the second preview image 1842 only. If obtaining an input to a displayed AoC mode shot button 1810, the controller 180 can take a shot of an image through the first camera 121a corresponding to the second preview image 1842. Thus, the terminal 100 can remove the selected preview image through the input to the displayed preview image.

The terminal according to various embodiments of the present invention can switch a camera for a shot in AoC mode in response to an input to a displayed preview image.

Figure 19:
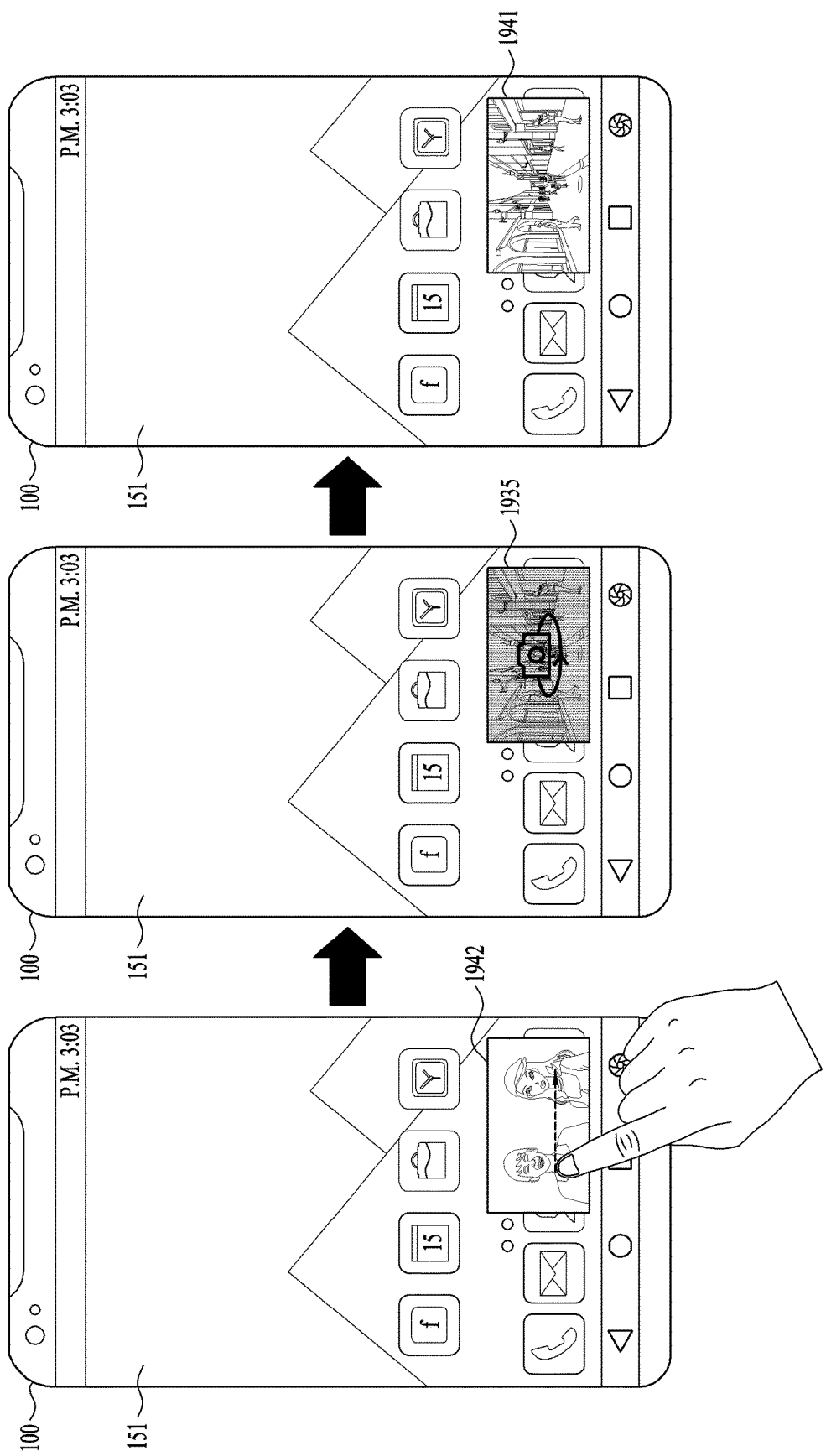
FIG. 19 is a diagram for an example of a camera switching according to various embodiments of the present invention.

FIG. 19 is a diagram for an example of a camera switching according to various embodiments of the present invention.

Referring to FIG. 19, the controller 180 can display a second preview image 1942 on a prescribed region of the display unit 151. Herein, the second preview image 1942 may include a preview image corresponding to the first camera 121a. The controller 180 can obtain an input of swiping the second preview image 1942 in a prescribed direction (e.g., a right direction). If obtaining the swipe input, the controller 180 can switch the second preview image 1942 to a first preview image 1941. Herein, the first preview image 1941 may include a preview image corresponding to the second camera 121b. Hence, the controller 180 can switch the camera corresponding to the displayed preview image. Meanwhile, when the camera corresponding to the preview image is switched, the controller 180 can display a camera switching icon on the preview image. For instance, when the second preview image 1942 corresponding to the first camera 121a is switched to the first preview image 1941 corresponding to the second camera 121b, the controller 180 can display the camera switching icon 1935 on the preview image for a predetermined time. For one embodiment, the controller 180 can display the camera switching icon 1935 for a time required for an operation of switching the first camera 121a to the second camera 121b.

The terminal 100 according to various embodiments of the present invention can take a shot of an image through a camera in response to an input to an FAB type AoC mode shot button as well as to the aforementioned AoC mode shot button.

Figure 20:
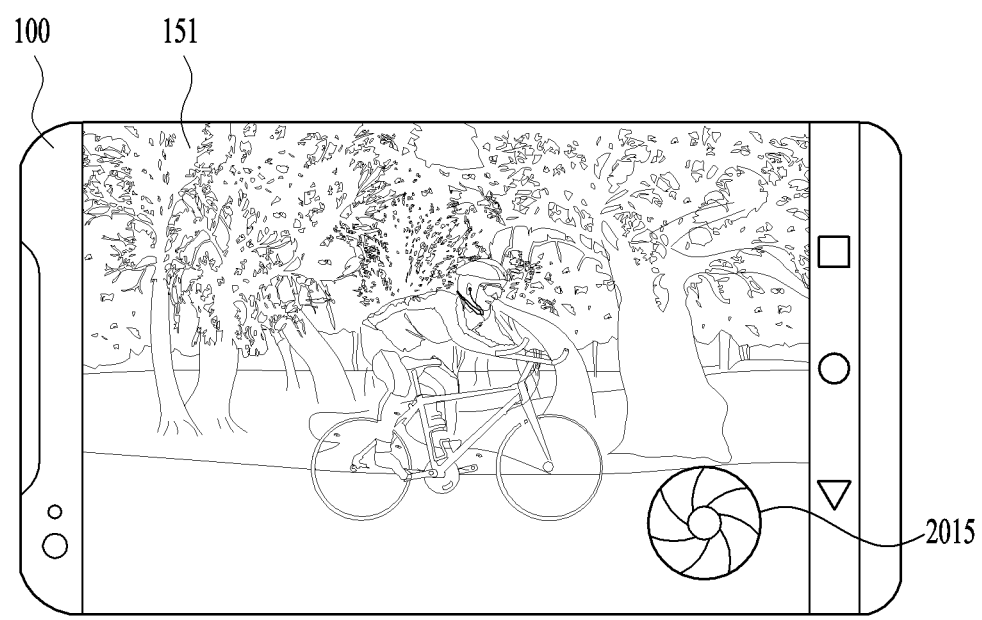
FIG. 20 is a diagram for an example of an image shot in response to an AoC mode shot button input of FAB type according to various embodiments of the present invention.

FIG. 20 is a diagram for an example of an image shot in response to an AoC mode shot button input of FAB type according to various embodiments of the present invention.

Referring to FIG. 20, the controller 180 can display an FAB type AoC mode shot button 2015 on a prescribed region of the display unit 151. The controller may or may not display a preview image on an inner region of the FAB type AoC mode shot button 2015. If obtaining an input of touching the displayed FAB type AoC mode shot button 2015, the controller 180 can take a shot of an image through the camera 121. And, the controller may or may not display the shot image on a prescribed region of the display unit 151 for a predetermined time. Thus, the terminal 100 can take a shot of an image in response to an input to the FAB type AoC mode shot button 2015. And, the above description and embodiment of the former AoC mode shot button are identically applicable to the FAB type AoC mode shot button 2015. Hence, details shall be omitted from the following description.

In AoC mode, the terminal 100 according to various embodiments of the present invention can take a shot of an image through the camera 121 in response to an input to a physical shot button provided to the terminal 100 or a physical shot button provided to a mobile coupled with the terminal 100.

Figure 21:
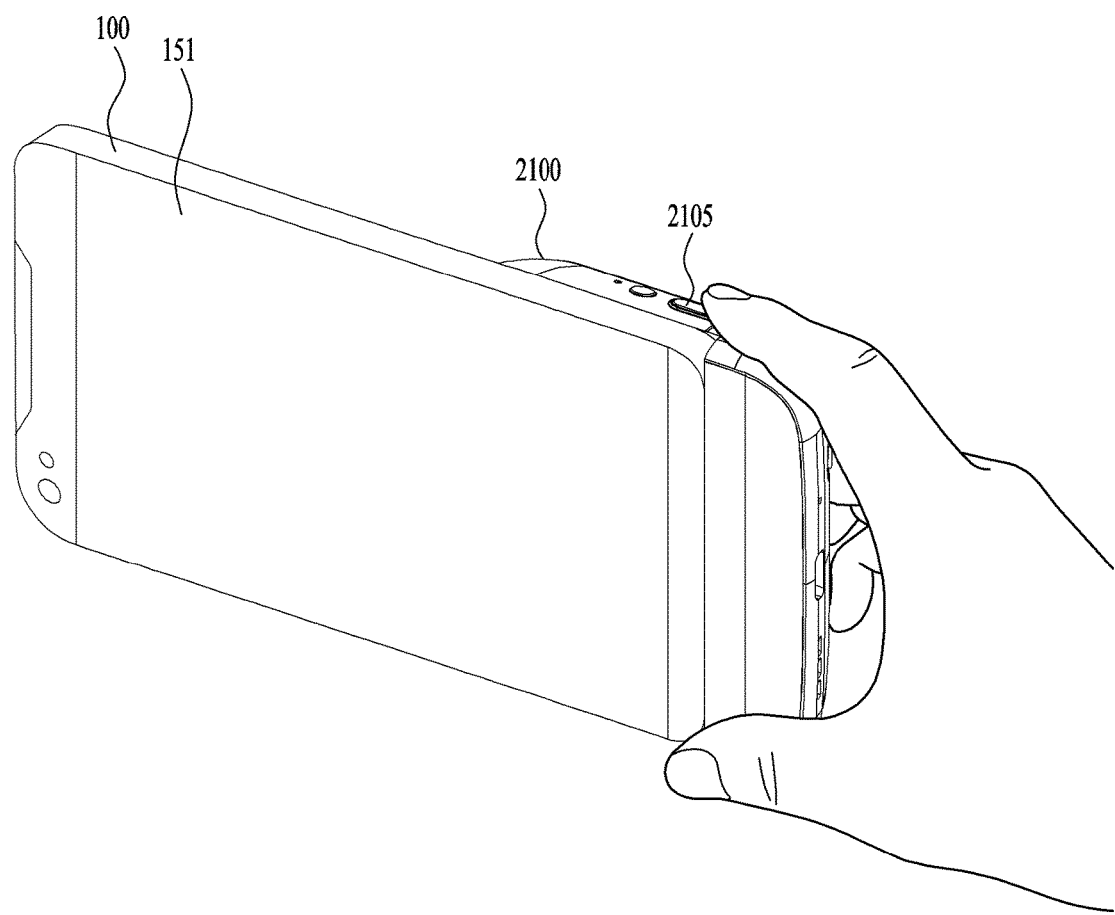
FIG. 21 is a diagram for an example of a shot in response to a physical button input according to various embodiments of the present invention.

FIG. 21 is a diagram for an example of a shot in response to a physical button input according to various embodiments of the present invention.

Referring to FIG. 21, the terminal 100 can be coupled with a camera manipulation module 2100. The camera manipulation module 2100 may include at least one of a key, button, dial and switch associated with camera functions of the terminal 100. And, the camera manipulation module 2100 may include a touch key, a touch pad and the like associated with camera functions of the terminal 100. The terminal 100 may receive an input related to the camera function from the coupled camera manipulation module 2100. For instance, the camera manipulation module 2100 can obtain an input related to the camera function and is able to deliver a signal of the obtained input to the controller 180 of the terminal 100. For one embodiment, while the camera manipulation module 2100 is coupled with the AoC mode enabled terminal 100, the camera manipulation module 2100 can obtain a first input of pushing a shot button 2105 shortly and is able to deliver a signal of the obtained first input to the terminal 100. Based on the delivered signal of the first input, the controller 180 can take a shot of an image through the camera 121 without a preview image display in AoC mode. For another embodiment, while the camera manipulation module 2100 is coupled with the AoC mode enabled terminal 100, the camera manipulation module 2100 can obtain a second input of pushing the shot button 2105 long and is able to deliver a signal of the obtained second input to the terminal 100. Based on the delivered signal of the second input, the controller 180 can display a preview image on a prescribed region of the display unit 151 in AoC mode. If the second input of pushing the shot button 2015 is not maintained, the camera manipulation module 2100 can deliver a release signal indicating that the second input is not maintained to the terminal 100. Based on the delivered release signal, the controller 180 of the terminal 100 can take a shot of an image displayed as a preview image through the camera 121. Thus, in response to an input to the shot button 2105 of the coupled camera manipulation module 2100, the terminal 100 can take a shot by displaying a preview image or not, in AoC mode.

FIG. 2 is referred to again.

Referring now to FIG. 2, the terminal 100 can determine a quality of the shot image taken in AoC mode [S240].

For instance, the controller 180 can compare a quality of a shot image with a reference quality. For one embodiment, the controller 180 can compare at least one of focus, brightness, color and blur of a shot image with each reference value. For instance, the controller 180 can compare a blur of a shot image with a reference blur. If the blur of the shot image is less than the reference blur, the controller 180 can determine that the blur of the shot image is above the reference quality. If the blur of the shot image is more than the reference blur, the controller 180 can determine that the blur of the shot image is below the reference quality. For instance, the controller 180 can compare a brightness of a shot image with a reference brightness. If the brightness of the shot image is smaller than the reference rightness, the controller 180 can determine that the brightness of the shot image is above the reference quality. If the brightness of the shot image is greater than the reference brightness, the controller 180 can determine that the brightness of the shot image is below the reference quality. Moreover, the controller 180 combines the aforementioned image conditions (e.g., focus, brightness, color and blur) and is able to compare a value of the combination with each reference value. Details of such comparison shall be omitted.

Descriptions of the quality determination of the shot image of the terminal 100 are non-limited by the above description. Various references related to the quality determination of the shot image are applicable. Hence, the terminal 100 can determine a quality of a shot image using the applicable various references.

If the determine quality of the shot image is below the reference quality, the terminal 100 can provide guide information related to an image to be taken [S250].

For instance, if the quality determined for the shot image is below the reference quality, the controller 180 of the terminal 100 can display guide information related to an image to be taken on the display unit 151. For another instance, if the quality determined for the shot image is below the reference quality, the controller 180 of the terminal 100 can output guide information, which is related to an image to be taken, as audio through the audio output module 152. For further instance, if the quality determined for the shot image is below the reference quality, the controller 180 of the terminal 100 can display guide information, which is related to an image to be taken, as a haptic effect through the haptic module 153. Herein, the guide information may include alarm information on the quality of the shot image as well as detailed information for improving a quality of an image. A detailed embodiment is described as follows.

Figure 22:
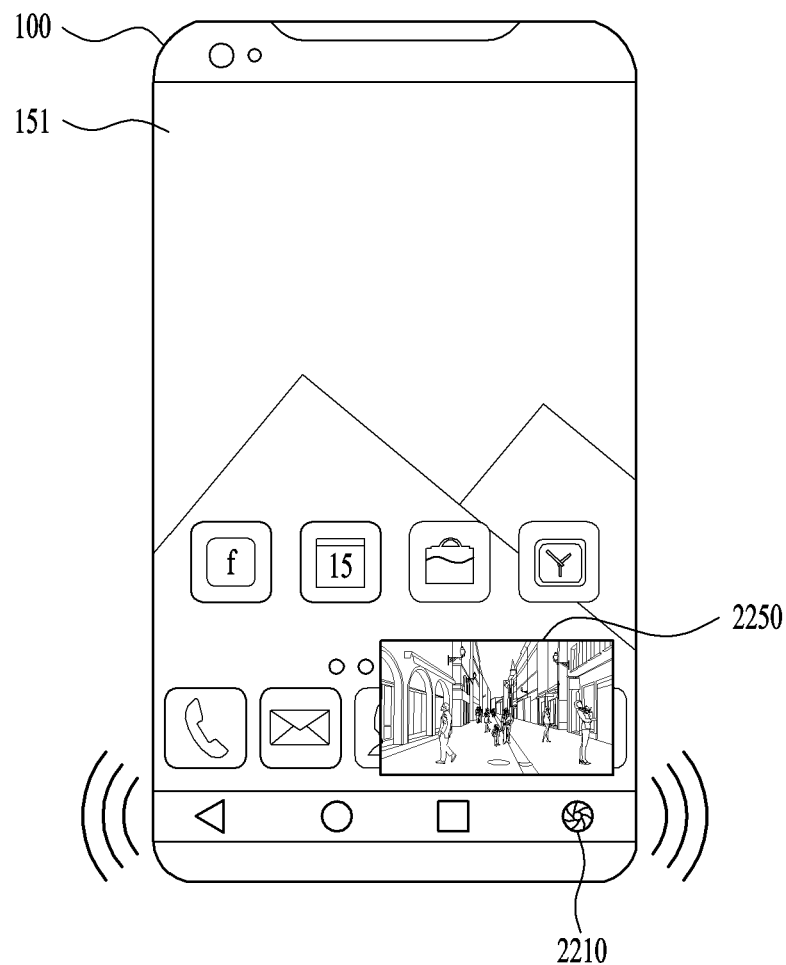
FIG. 22 is a diagram to illustrate a vibration alarm for a shot image according to various embodiments of the present invention.

FIG. 22 is a diagram to illustrate a vibration alarm for a shot image according to various embodiments of the present invention.

Referring to FIG. 22, the terminal 100 can display a shot image 2250 taken in AoC mode on a prescribed region of the display unit 151. If a quality determined for the shot image 2250 is below a reference quality, the controller 180 can generate a vibration alarm. For instance, if the quality of the shot image 2250 taken in AoC mode is below the reference quality, the controller 180 can control the haptic module 153 to generate vibration. If the shot image below the reference quality occurs over a reference count in AoC mode, the controller 180 may control the haptic module 153 to generate vibration. Hence, through the vibration generated from the terminal 100, a user can recognize that the shot image 2250 taken in AoC mode is below the reference quality.

Figure 23:
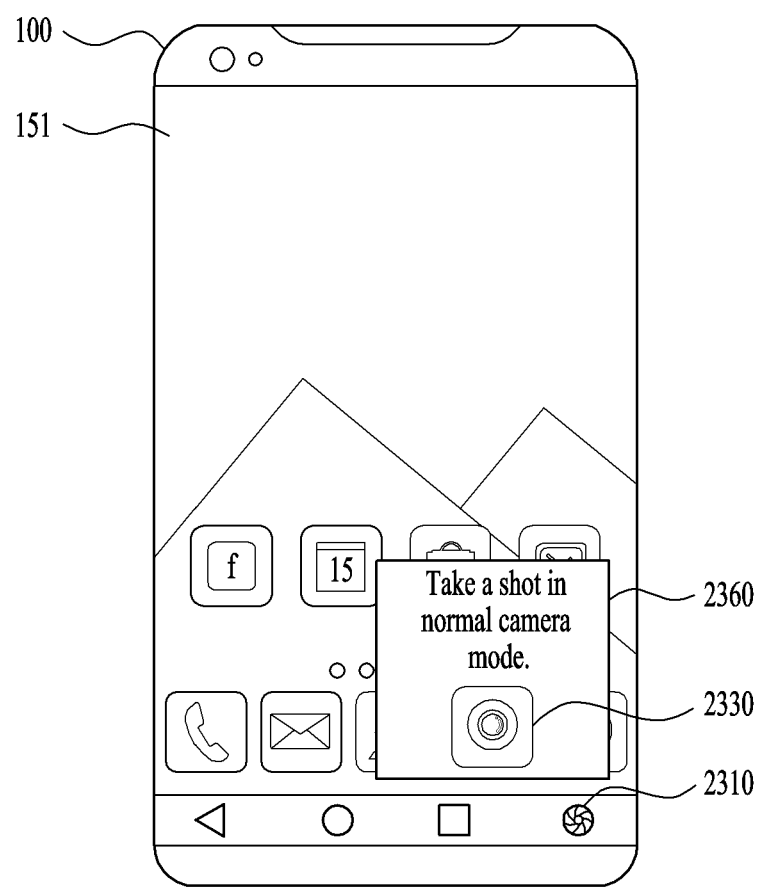
FIG. 23 is a diagram for an example of a guide menu output according to various embodiments of the present invention.

FIG. 23 is a diagram for an example of a guide menu output according to various embodiments of the present invention.

Figure 24:
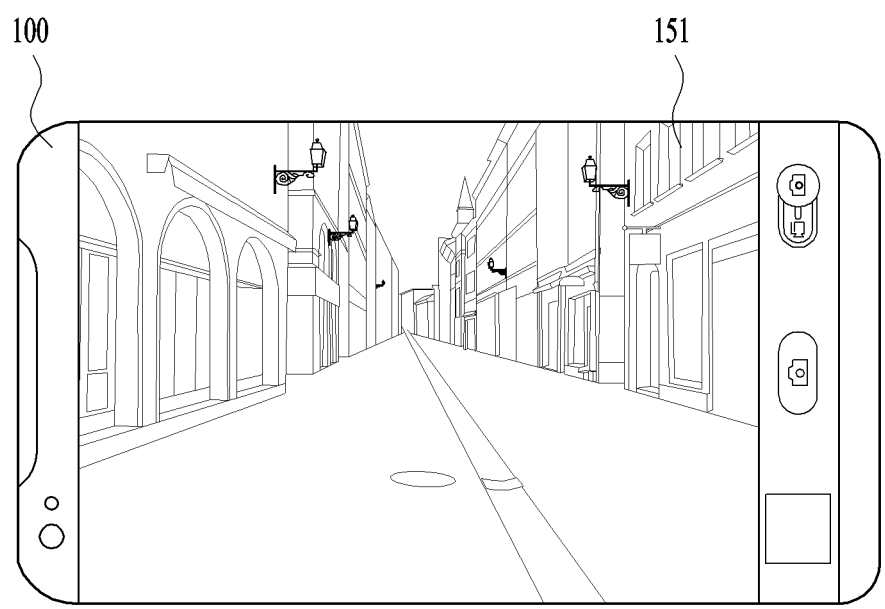
FIG. 24 is a diagram for an example of a preview screen according to various embodiments of the present invention.

FIG. 24 is a diagram for an example of a preview screen according to various embodiments of the present invention.

Referring to FIG. 23, if a quality of a shot image taken in AoC mode is below a reference quality, the controller 180 can display a guide menu, which includes information related to a shot (e.g., a quality of a shot image, an advice for an image shot, etc.), on the display unit 151. For instance, if the quality of the shot image taken in AoC mode is below the reference quality, the controller 180 can display a guide menu 2360 on the display unit 151. For one embodiment, the controller 180 can display a message, which suggests to take a shot of an image not in AoC mode but in normal camera mode (e.g., a camera application screen), on the guide menu 2360, and may display a camera application icon 2330 for launching a camera application. Moreover, in AoC mode, if the shot image below the reference quality occurs over a reference count, the controller 180 may display the aforementioned guide menu 2360. If obtaining an input of selecting the camera application icon 2330 displayed on the guide menu 2360, the controller 180 launches the camera application and is able to display a camera application screen on the display unit 151. For instance, as shown in FIG. 24, the terminal 100 can display a preview screen, which displays a preview image of a shot image taken through the camera 121, on the display unit 151. Hence, a user can take a shot of an image by watching the preview screen displayed on the display unit 151 of the terminal 100.

Moreover, if the quality of the shot image taken in AoC mode is below the reference quality, the controller 180 can control the optical output unit 154 to output a signal for indicating an event occurrence using a light of a light source.

As mentioned in the above description, the terminal 100 according to various embodiments of the present invention can determine a quality of a shot image. If the determined quality is below a reference quality, the terminal 100 can provide guide information in various ways.

FIG. 2 is referred to again.

Referring now to FIG. 2, the terminal 100 can provide a user interface for handling an image below a reference quality among shot images taken in AoC mode [S260].

The terminal 100 according to various embodiments of the present invention can provide a user interface for handling an image below a reference quality among shot images taken in AoC mode. For instance, the controller 180 can provide a user interface capable of performing at least one of confirmation, deletion, storage, sorting, sharing and transmission of an image below a reference quality among shot images taken in AoC mode. And, the terminal 100 can provide a user interface for handling an image below a reference quality with respect to an overlapping image among shot images taken in AoC mode. Hence, the terminal 100 may regard the overlapping image among the shot images taken in AoC mode as the same image below the quality.

Detailed embodiment shall be described with reference to FIGS. 25 to 30 as follows.

Figure 25:
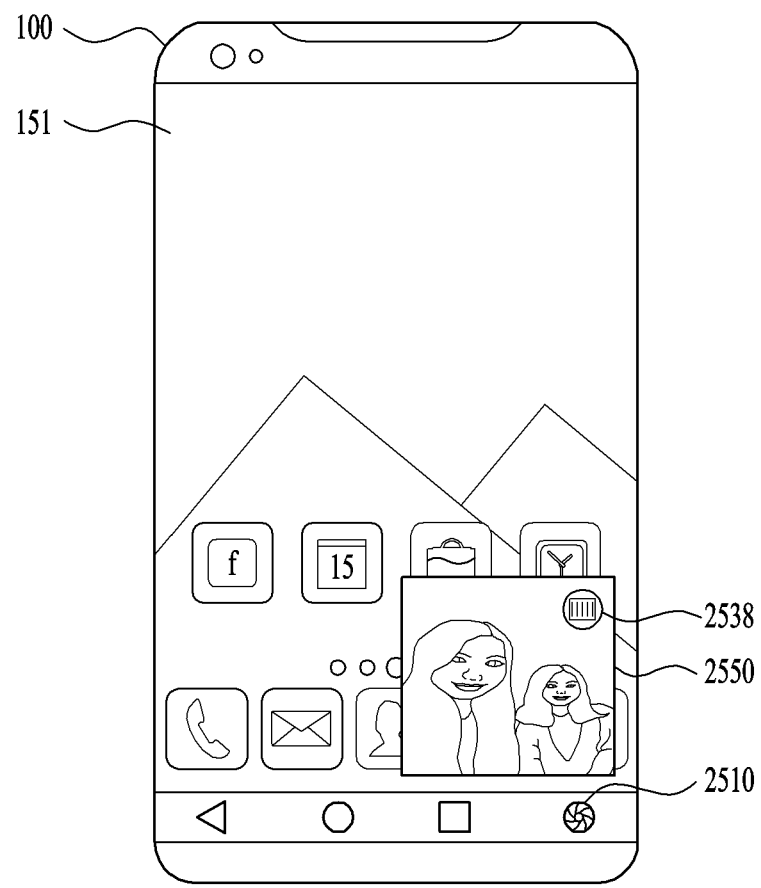
FIG. 25 is a diagram for an example of a DELETE menu display according to various embodiments of the present invention.

FIG. 25 is a diagram for an example of a DELETE menu display according to various embodiments of the present invention.

Referring to FIG. 25, the terminal 100 can display a shot image 2550 taken in AoC mode on a prescribed region of the display unit 151. If a quality of the shot image 2550 is below a reference quality, the controller 180 can display a DELETE button 2538 on the displayed image 2550. If obtaining an input to the displayed DELETE button 2538, the controller 180 can delete the shot image 2550. After the controller 180 displays the image 2550 having the DELETE button 2538 displayed thereon on the display unit 151, if a predetermined time expires, the controller 180 may delete the shot image 2550. For one embodiment, if the shot image 2550 taken in AoC mode is below the reference quality and is not taken again within a predetermined time, the controller 180 can delete the shot image 2550.

Figure 26:
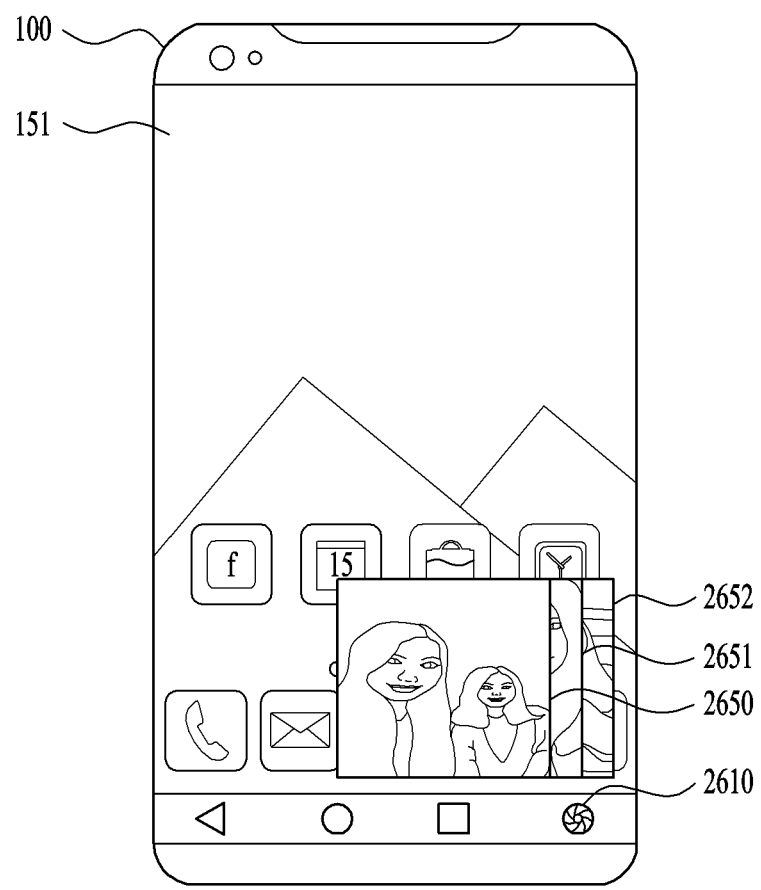
FIG. 26 is a diagram for an example of displaying a plurality of shot images according to various embodiments of the present invention.

FIG. 26 is a diagram for an example of displaying a plurality of shot images according to various embodiments of the present invention.

Referring to FIG. 26, the terminal 100 can display a plurality of images below a reference quality among shot images taken in AoC mode on the display unit 151. For instance, among shot images taken in AoC mode, the controller 180 can display first to third images 2660 to 2662 below the reference quality on the display unit 151. The controller 180 can display the first to third images 2660 to 2662 as a plurality of layers. Hence, the first to third images 2660 to 2662 can be displayed as different layers, respectively. Based on an input to a prescribed one of the first to third images 2660 to 2662 displayed as the different layers, the controller 180 can change the layers of the displayed first to third images 2660 to 2662. If obtaining an input of selecting one of the displayed first to third images 2660 to 2662, the controller 180 can display the selected image on a gallery application screen.

The terminal 100 according to various embodiments of the present invention can sort shot images taken in AoC mode into a single folder and is able to distinguishably display an image below a reference quality among the shot images in the sorted folder. This is described with reference to FIG. 27 as follows.

Figure 27:
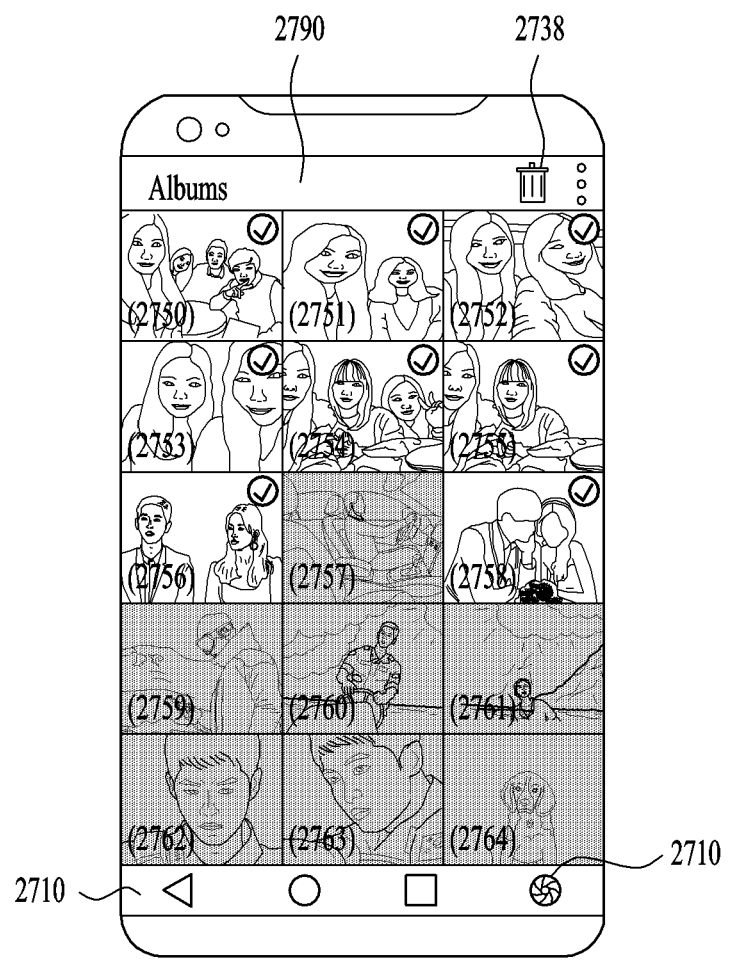
FIG. 27 is a diagram for an example of a sorted display of shot images according to various embodiments of the present invention.

FIG. 27 is a diagram for an example of a sorted display of shot images according to various embodiments of the present invention.

Referring to FIG. 27, the terminal 100 can display a plurality of shot images taken in AoC mode on a single folder (e.g., a temporary folder, an AoC mode shot folder, etc.). For instance, the controller 180 sorts a plurality of shot images 2750 to 2764 taken in AoC mode into a single folder and is then able to display them on the display unit 151. The controller 180 selects an image below a reference quality from a plurality of the displayed images 2750 to 2764 and is able to display the selected image distinguishably in a manner of representing an activated state (e.g., representing clearly). In response to a user input, the controller 180 may display or remove a selected mark of the displayed image. The controller 180 can display an image, of which image quality is above the reference quality, among a plurality of the displayed images 2750 to 2764 in a manner of representing a deactivated state (e.g., a blurred state). The controller 180 can display a DELETE button 2738. If obtaining an input of selecting the DELETE button 2738, the controller 180 can delete the selected image. Thus, the terminal 100 can display a plurality of shot images taken in AoC mode. The terminal 100 selectively checks images below the reference quality among a plurality of the displayed shot images and is then able to delete the checked images at a time in response to an input to the DELETE button 2738.

The terminal 100 according to various embodiments of the present invention can display an image, of which quality is below a reference quality, among shot images taken in AoC mode on a lock screen and is able to provide a user interface for saving or deleting the displayed image on the lock screen. This is described with reference to FIG. 28 as follows.

Figure 28:
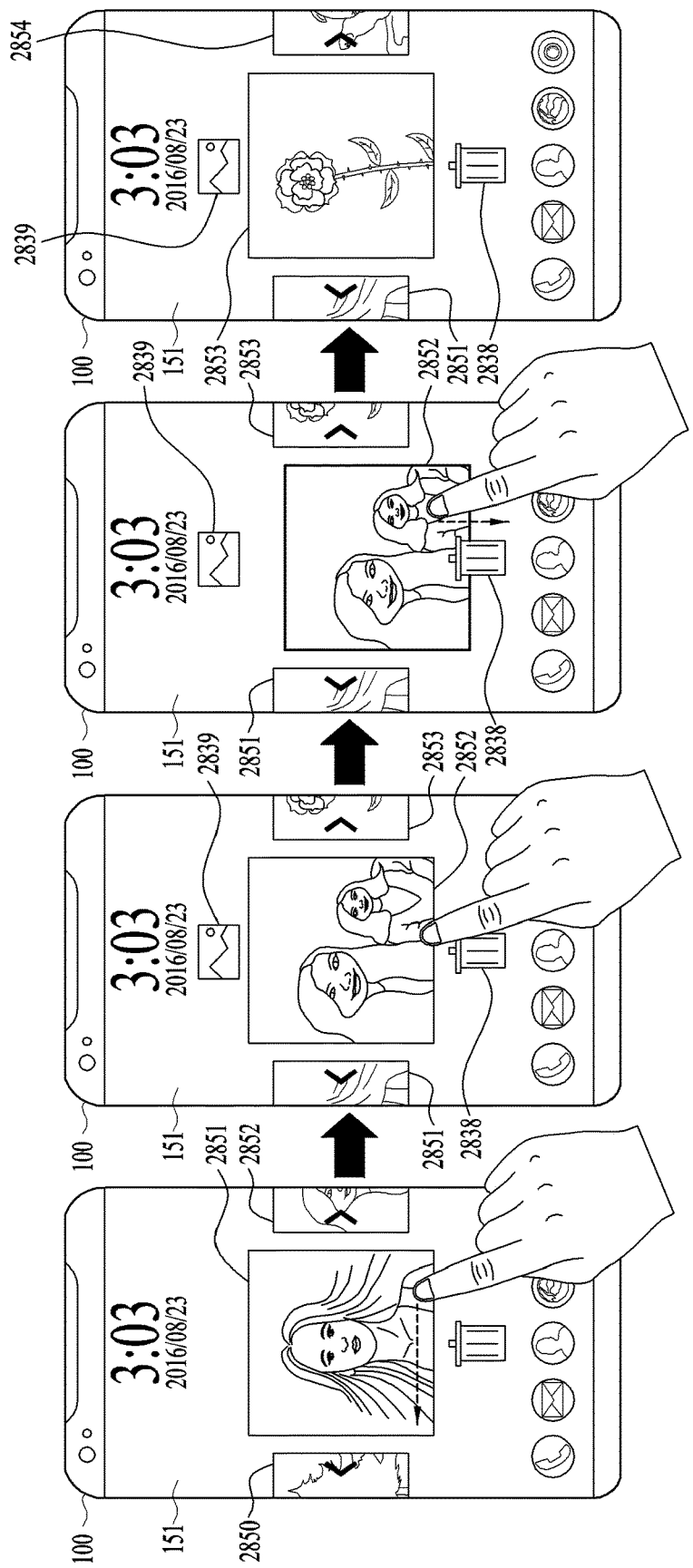
FIG. 28 is a diagram of an image handling user interface on a lock screen of according to various embodiments of the present invention.

FIG. 28 is a diagram of an image handling user interface on a lock screen of according to various embodiments of the present invention.

Referring to FIG. 28, the terminal 100 displays a lock screen on the display unit 151. The terminal 100 can display an image, of which quality is below a reference quality, among shot images taken in AoC mode on the lock screen. For instance, the controller 180 can display a first image 2850, a second image 2851 and a third image 2852, each of which has a quality below the reference quality among the shot images taken in AoC mode, on the lock screen. If obtaining an input of swiping one of the displayed images in one direction, the controller 180 can switch and display the displayed images in response to the obtained swipe input. For instance, if obtaining an input of swiping the second image 2851 in a left direction on a screen having the first to third images 2851 to 2853 displayed thereon, the controller 180 can display the second image 2851, the third image 2852 and a fourth image 2853 on the display unit 151. If obtaining an input of selecting one of the displayed images, the controller 180 can display a menu or icon for saving or deleting the selected image. For instance, if obtaining an input of selecting the displayed third image 2852, the controller 180 can display a SAVE icon (e.g., a gallery application icon 2839) and a DELETE icon (e.g., a trash box icon 2838) on the display unit 151. The controller 180 can obtain an input of dragging the selected third image 2852 to the SAVE icon 2839 or the DELETE icon 2838 and is able to perform an operation corresponding to the dragged icon. For instance, if obtaining an input of dragging the selected third image 28542 to the DELETE icon 2838, the controller 180 can delete the selected third image 2852. And, the controller 180 no longer displays the deleted third image 2852, displays the third image 2853 at a location where the deleted third image 2852 was displayed, and then displays a fifth image 2854 at a location where the fourth image 2853 was displayed. For another instance, the controller 180 obtains an input of dragging the selected third image 2852 to the SAVE icon 2839 and is able to save the third image 2852. The controller 180 may continue to display the displayed SAVE icon 2839 and the displayed DELETE icon 2838 on the display unit 151, or may display the SAVE icon 2839 and the DELETE icon 2838 on the display unit 151 only if one image is selected. Among the shot images, which are taken in AoC mode, below the reference quality, the controller 180 can no longer display a saved image among the shot images on the lock screen. Meanwhile, the above-mentioned image displayed on the lock screen may include the image, which was taken without a preview image, below the reference quality among the shot images taken in AoC mode. Hence, among the shot images taken in AoC mode, an image taken in a state that a preview image is displayed may not be displayed on the lock screen despite being below the reference quality.

The terminal 100 according to various embodiments of the present invention can display a shot image taken without displaying a preview image among shot images taken in AoC mode in a manner that the displayed shot image is distinguished from other images. This is described with reference to FIG. 29 as follows.

Figure 29:
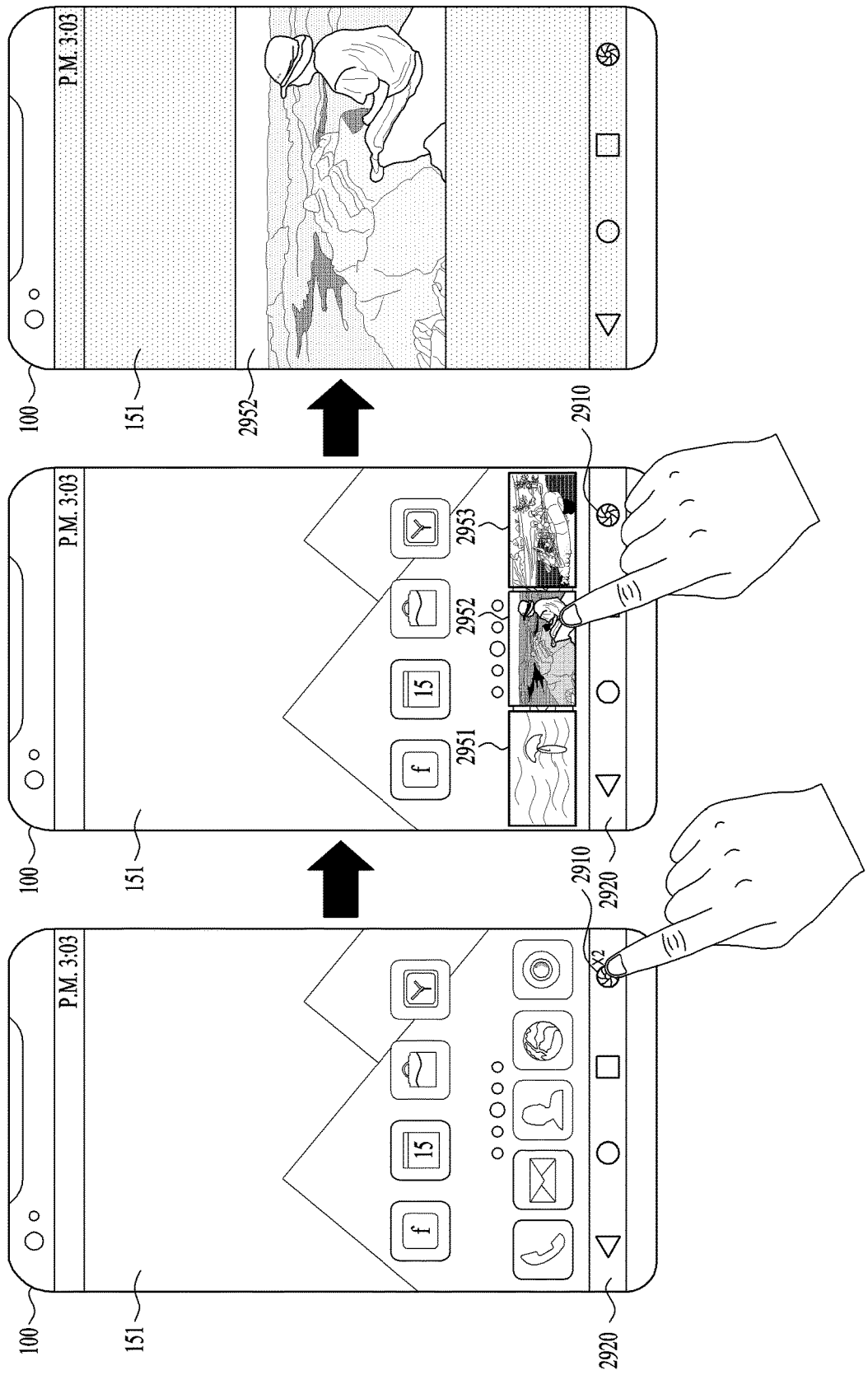
FIG. 29 is a diagram to illustrate a display of shot images in AoC mode according to various embodiments of the present invention.

FIG. 29 is a diagram to illustrate a display of shot images in AoC mode according to various embodiments of the present invention.

Referring to FIG. 29, the terminal 100 can display an AoC mode shot button on a prescribed region of the display unit 151. For instance, the controller 180 can display an AoC mode shot button 2910 on a navigation bar 2920. The controller 180 can obtain an input of double tapping the displayed AoC mode shot button 2910 and is able to display at least one image taken in AoC mode on the display unit 151 in response to the obtained input. For instance, the controller 180 can display first to third images 2951 to 2953 taken in AoC mode on the display unit 151. When the controller 180 displays a plurality of shot images taken in AoC mode on the display unit 151, the controller 180 can distinguishably display the shot image taken in a state of displaying a preview image and the shot image taken in a state of not displaying a preview image. For one embodiment, the controller 180 displays the first and third images 2951 and 2953 taken in the state of not displaying preview images in a manner of highlighting the first and third images 2951 and 2953, and also displays the second image 2952 taken in the state of displaying a preview image in a manner of not highlighting the second image 2952. The controller 180 can display an image selected from the displayed images on a full screen of the display unit 151. For instance, if obtaining an input of selecting the second image 2952 from the first to third images 2951 to 2953, the controller 180 can display the second image 2952 on a full screen of the display unit 151. And, the controller may no more highlight the image confirmed in the gallery application among the highlighted images. For instance, the controller 180 may no more highlight the confirmed one of the highlighted first and third images 2951 and 2953.

In case of displaying shot images like a gallery application, the terminal 100 according to various embodiments of the present invention can display the shot image taken in AoC mode in a manner of distinguishing the shot image from other images. And, the terminal 100 is able to display an image unchecked by a user among the shot images taken in AoC mode in a manner that the unchecked image is distinguished from other images. This is described with reference to FIG. 30 as follows.

FIG. 30 is a diagram for an example of a shot image display according to various embodiments of the present invention.

Referring to FIG. 20, the controller 180 can display images unchecked by a user after being taken in AoC mode on a gallery application screen in a manner of sorting the unchecked images into a single folder. For instance, the controller 180 can display an AoC unchecked folder indicating an image unchecked by a user after being taken in AoC mode in a manner of distinguishing the AoC unchecked folder from other folders. And, the controller 180 can display a first image 3051, which is taken in AoC mode and unchecked by the user, on the AoC unchecked folder. Moreover, the controller 180 can display a DELETE button 3038 for deleting the first image 3051. If obtaining an input of selecting the displayed DELETE button 3038, the controller 180 can delete the first image 3051. The controller 180 can display a second image 3052 on the folder from which the first image 3051 was deleted and is also able to display a DELETE button 3038 for deleting the second image 3052. Herein, the second image 3052 may include an image unchecked by a user after being taken in AoC mode. Thus, the terminal 100 can display an image, which is taken in AoC mode and unchecked by a user, in a manner of distinguishing the unchecked image from other images.

The terminal 100 according to various embodiments of the present invention can take a shot of an image in a manner of linking to a camera of a different device as well as to the camera 121 provided to the terminal 100. And, the terminal 100 can provide a user interface for enabling the camera of the different device to capture an image in AoC mode. This is described with reference to FIG. 31 as follows.

Figure 31:
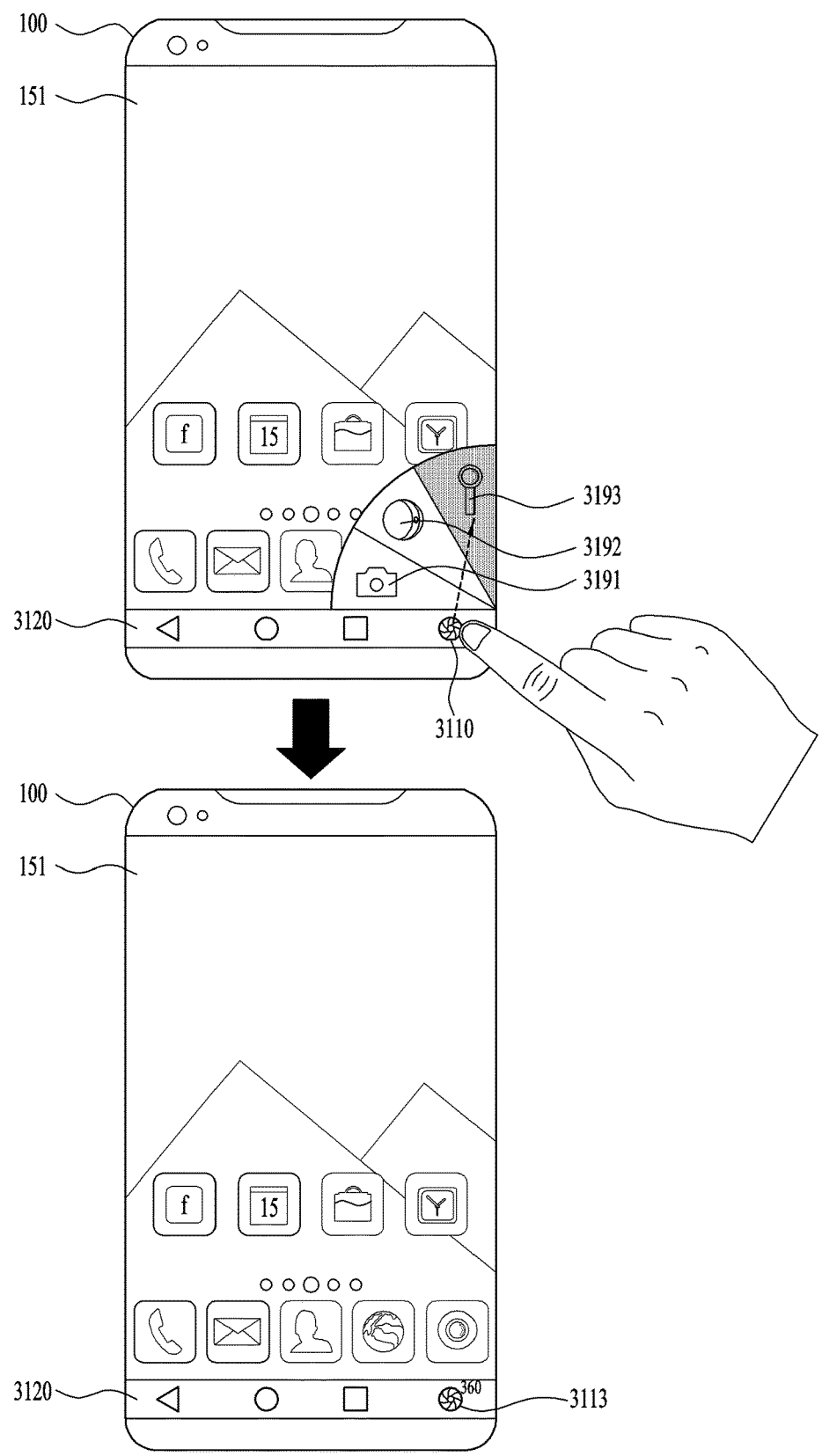
FIG. 31 is a diagram for an example of an AoC shot button for other devices according to various embodiments of the present invention.

FIG. 31 is a diagram for an example of an AoC shot button for other devices according to various embodiments of the present invention.

Referring to FIG. 31, the terminal 100 displays an AoC shot button 3110 on a navigation bar 3120 and is also able to display icons corresponding to a plurality of devices capable of capturing images in AoC mode. The terminal 100 obtains an input of selecting the device to capture an image in AoC mode and is able to display an AoC mode shot button corresponding to the selected device. For instance, the controller 180 can display a camera icon 3191 corresponding to the camera 121 of the terminal 100, an action cam icon 3192 corresponding to an action cam (not shown) as a first external device, and a 360 camera icon 3193 corresponding to a 360 camera (not shown) as a second external device. Herein, the action cam of the first external device and the 360 camera of the second external device can link to the terminal 100 and can capture images under the control of the terminal 100. The controller 180 obtains an input of selecting the 360 camera icon 3193 corresponding to the 360 camera from the displayed icons, and is able to set the selected 360 camera as a device for capturing images in AoC mode. The controller 180 can display an AoC mode shot button 3113 corresponding to the 360 camera on a prescribed region of the display unit 151 (e.g., a navigation bar 3120). If obtaining an input to the AoC mode shot button 313 corresponding to the 360 camera, the controller 180 can control the 360 camera to capture an image. Thus, the terminal 100 can take a shot of an image using another linked device in AoC mode as well as the camera 121 provided to the terminal 100. And, the terminal 100 can provide a user interface for selecting or switching to another device to capture an image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal comprising:
  a touchscreen;
  a camera configured to capture an image; and
  a controller configured to:
  enable an AoC (always on camera) mode for maintaining a state for the camera to capture the image,
  control the state for the camera to capture the image to be maintained and display a shot button for capturing the image in the enabled AoC mode,
  control the camera to capture a first image in the AoC mode without displaying a preview image of the first image and display the captured first image in response to a first touch input to the displayed shot button,
  display a preview image of a second image and control the camera to capture the second image in the AoC mode without displaying the captured second image in response to a second touch input to the displayed shot button, and
  after capturing the first image, display a plurality of images including the first image which were captured in the AoC mode without displaying preview images of the plurality of images.

2. The terminal of claim 1, wherein the controller displays the preview image of the second image to be captured on at least a region of the touchscreen, and wherein when a pinch-in input is received in the course of displaying the preview image the AoC mode is enabled.

3. The terminal of claim 1, wherein the controller controls the touchscreen to display a screen of at least one launched application in the AoC mode.

4. The terminal of claim 1, wherein the shot button is located on a prescribed region of the touchscreen.

5. The terminal of claim 4, wherein the controller displays the shot button of an FAB (floating action button) type and wherein the controller displays the preview image of the second image to be captured by the camera on an inner region of the displayed shot button of the FAB type.

6. The terminal of claim 1, wherein the controller determines a quality of the captured image based on at least one selected from the group consisting of focus, brightness, color and blur of the captured image taken in the AoC mode and wherein if the determined quality is below a reference quality, the controller outputs a guide information on the image taken in the AoC mode.

7. The terminal of claim 1, wherein the controller determines a quality of the captured image based on at least one selected from the group consisting of focus, brightness, color and blur of the captured image taken in the AoC mode and wherein the controller provides a user interface for handling the image below a reference quality among captured images taken in the AoC mode.

8. The terminal of claim 7, wherein the controller displays the image below the reference quality among the captured images taken in the AoC mode on the touchscreen, wherein the controller displays a DELETE menu for deleting the image below the reference quality and a SAVE menu for saving the image below the reference quality, wherein if obtaining an input of selecting the displayed DELETE menu, the controller deletes the displayed image below the reference quality, and wherein if obtaining an input of selecting the displayed SAVE menu, the controller saves the displayed image below the reference quality.

9. A method of operating a terminal, comprising:
  enabling an AoC (always on camera) mode for maintaining a state for a camera to capture an image and displaying a shot button for capturing the image on a touchscreen of the terminal;
  capturing a first image in the AoC mode without displaying a preview image of the first image and displaying the captured first image in response to a first touch input to the displayed shot button;
  displaying a preview image of a second image and capturing the second image in the AoC mode without displaying the captured second image in response to a second touch input to the displayed shot button; and
  after capturing the first image, displaying a plurality of images including the first image which were captured in the AoC mode without displaying preview images of the plurality of images.

10. The method of claim 9, further comprising the steps of:
  displaying a preview image of the second image to be captured on at least a region of the touchscreen,
  receiving a pinch-in input in the course of displaying the preview image; and
  enabling the AoC mode.

11. The method of claim 9, further comprising displaying a screen of at least one launched application in the AoC mode.

12. The method of claim 9, the displaying the shot button, comprising:

displaying the shot button of an FAB (floating action button) type; and displaying the preview image of the second image to be captured by the camera on an inner region of the displayed shot button of the FAB type.

13. The method of claim 9, further comprising:

determining a quality of the captured image based on at least one selected from the group consisting of focus, brightness, color and blur of the captured image taken in the AoC mode; and if the determined quality is below a reference quality, outputting a guide information on the image taken in the AoC mode.

14. The method of claim 9, further comprising:

determining a quality of the captured image based on at least one selected from the group consisting of focus, brightness, color and blur of the captured image taken in the AoC mode; and providing a user interface for handling the image below a reference quality among captured images taken in the AoC mode.

15. The method of claim 14, the providing the user interface for handling the image below the reference quality, comprising:

displaying the image below the reference quality among the captured images taken in the AoC mode;

displaying a DELETE menu for deleting the image below the reference quality and a SAVE menu for saving the image below the reference quality;

if obtaining an input of selecting the displayed DELETE menu, deleting the displayed image below the reference quality; and if obtaining an input of selecting the displayed SAVE menu, saving the displayed image below the reference quality.

* * * * *